US010222900B2

(12) United States Patent
Jeong et al.

(10) Patent No.: US 10,222,900 B2
(45) Date of Patent: Mar. 5, 2019

(54) METHOD AND APPARATUS FOR DIFFERENTIATING BETWEEN GRIP TOUCH EVENTS AND TOUCH INPUT EVENTS ON A MULTIPLE DISPLAY DEVICE

(71) Applicant: Samsung Electronics Co., Ltd., Gyeonggi-do (KR)

(72) Inventors: Hyesoon Jeong, Gyeongsangbuk-do (KR); Kyuchul Kong, Gyeongsangbuk-do (KR); Daesik Hwang, Daegu (KR); Hoondo Heo, Gyeonggi-do (KR); Cheonkum You, Daegu (KR); Junho Lee, Daegu (KR); Hyunsuk Choi, Daegu (KR)

(73) Assignee: Samsung Electronics Co., Ltd (KR)

( * ) Notice: Subject to any disclaimer, the term of this patent is extended or adjusted under 35 U.S.C. 154(b) by 52 days.

(21) Appl. No.: 15/299,038

(22) Filed: Oct. 20, 2016

(65) Prior Publication Data

US 2017/0185212 A1 Jun. 29, 2017

(30) Foreign Application Priority Data

Dec. 24, 2015 (KR) .................. 10-2015-0186506

(51) Int. Cl.
*G06F 3/041* (2006.01)
*G06F 3/044* (2006.01)
(52) U.S. Cl.
CPC ............ *G06F 3/0416* (2013.01); *G06F 3/044* (2013.01); *G06F 3/0412* (2013.01); *G06F 2203/04102* (2013.01); *G06F 2203/04104* (2013.01)

(58) Field of Classification Search
CPC ....... G06F 3/0416; G06F 3/0412; G06F 3/044
See application file for complete search history.

(56) References Cited

U.S. PATENT DOCUMENTS

| 8,644,885 | B1 | 2/2014 | Tseng |
| 8,719,719 | B2 | 5/2014 | Cohen et al. |
| 9,910,521 | B2 | 3/2018 | Ahn |
| 2009/0006991 | A1 | 1/2009 | Lindberg |

(Continued)

FOREIGN PATENT DOCUMENTS

| JP | 2013161221 | 8/2013 |
| JP | 5818339 | 11/2015 |
| KR | 1020090025862 | 3/2009 |

*Primary Examiner* — Ryan A Lubit
(74) *Attorney, Agent, or Firm* — The Farrell Law Firm, P.C.

(57) ABSTRACT

An electronic device capable of touch event processing is provided. The electronic device includes first and second surfaces oriented in different directions, the second surface being narrower than the first surface, a touchscreen display including a touch panel, and having a first section exposed through the first surface and a second section exposed through the second surface, a processor electrically connected with the touchscreen display, and a memory that stores instructions that cause, when executed, the processor to activate the touch panel, to detect a first touch event on one of the first section and the second section, to detect a second touch event on the other section after detection of the first touch event, to remove one of the first touch event and the second touch event, and to perform a function according at least partly to the remaining touch event.

19 Claims, 36 Drawing Sheets

(56) References Cited

U.S. PATENT DOCUMENTS

| | | |
|---|---|---|
| 2009/0174679 A1 | 7/2009 | Westerman |
| 2009/0184935 A1 | 7/2009 | Kim |
| 2010/0079395 A1 | 4/2010 | Kim |
| 2010/0138680 A1 | 6/2010 | Brisebois et al. |
| 2010/0240415 A1 | 9/2010 | Kim |
| 2011/0285645 A1 | 11/2011 | Cho |
| 2012/0075212 A1 | 3/2012 | Park et al. |
| 2012/0262407 A1 | 10/2012 | Hinckley et al. |
| 2012/0313872 A1 | 12/2012 | Zhang et al. |
| 2013/0009890 A1 | 1/2013 | Kwon |
| 2013/0076612 A1 | 3/2013 | Myers |
| 2013/0154926 A1 | 6/2013 | Kim |
| 2013/0201160 A1 | 8/2013 | Ito et al. |
| 2013/0222338 A1* | 8/2013 | Gim ............ G06F 3/041 345/174 |
| 2013/0328793 A1 | 12/2013 | Chowdhury |
| 2013/0339720 A1 | 12/2013 | Levy |
| 2014/0033142 A1 | 1/2014 | Ding |
| 2014/0109217 A1 | 4/2014 | Park |
| 2014/0125612 A1* | 5/2014 | Park ............ G06F 3/0416 345/173 |
| 2014/0215612 A1 | 5/2014 | Park et al. |
| 2014/0168135 A1 | 6/2014 | Saukko |
| 2014/0189608 A1 | 7/2014 | Shuttleworth |
| 2014/0253477 A1* | 9/2014 | Shim ............ G06F 3/0487 345/173 |
| 2014/0298268 A1 | 10/2014 | Kang |
| 2014/0325195 A1 | 10/2014 | Xu |
| 2014/0340338 A1* | 11/2014 | Kim ............ G06F 3/0488 345/173 |
| 2015/0035767 A1* | 2/2015 | Chen ............ G06F 3/0416 345/173 |
| 2015/0035795 A1 | 2/2015 | Oshita et al. |
| 2015/0095826 A1* | 4/2015 | Ahn ............ G06F 3/0488 715/769 |
| 2015/0169071 A1 | 6/2015 | Jitkoff |
| 2015/0249733 A1 | 9/2015 | Miura |
| 2016/0026323 A1 | 1/2016 | Wu et al. |
| 2016/0062515 A1* | 3/2016 | Bae ............ G06F 3/0414 345/174 |
| 2016/0062556 A1* | 3/2016 | Chung ............ G06F 3/0481 715/781 |
| 2016/0070338 A1* | 3/2016 | Kim ............ G06F 3/0488 345/173 |
| 2017/0123590 A1 | 5/2017 | Han |

\* cited by examiner

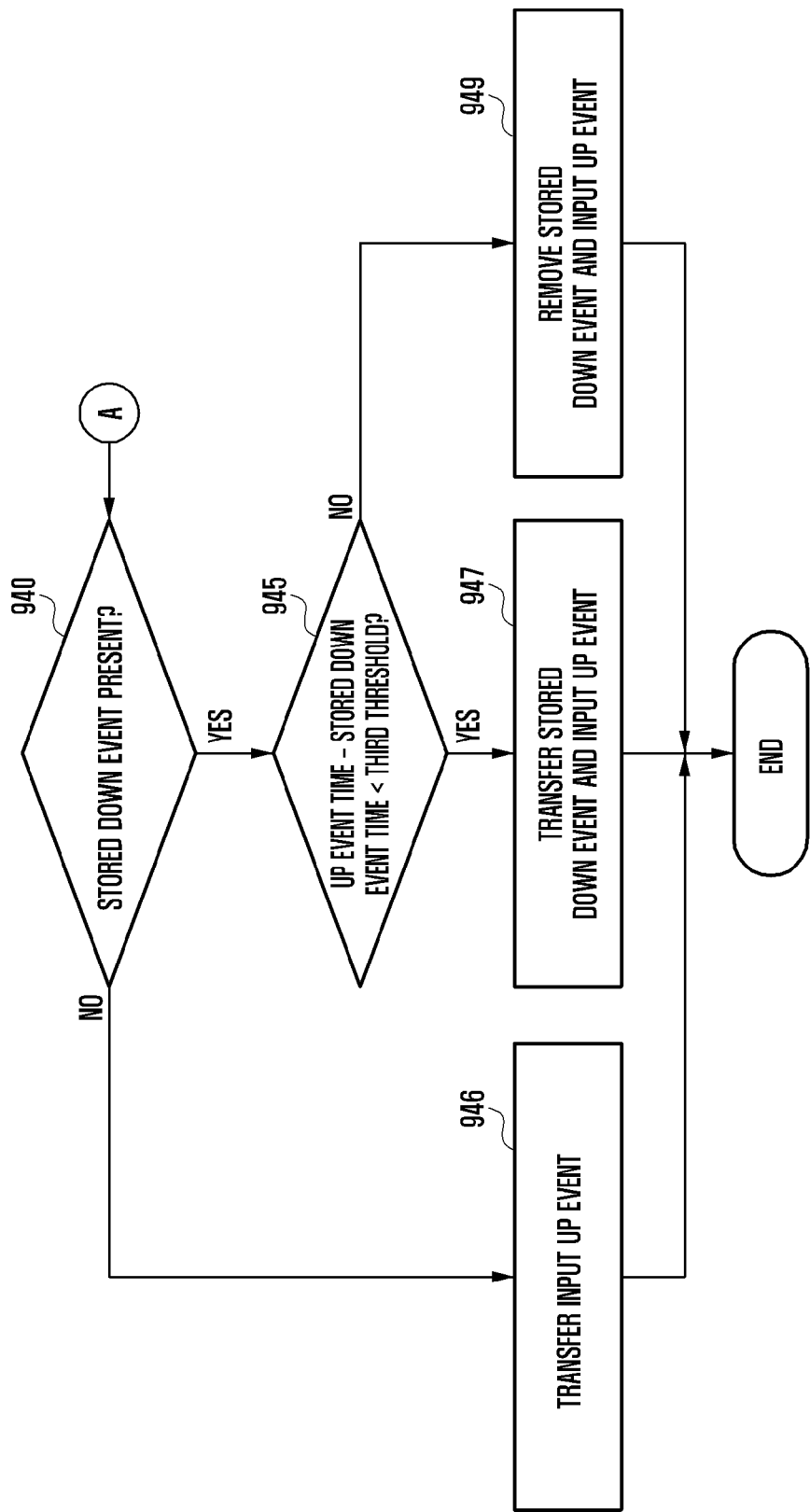

METHOD AND APPARATUS FOR DIFFERENTIATING BETWEEN GRIP TOUCH EVENTS AND TOUCH INPUT EVENTS ON A MULTIPLE DISPLAY DEVICE

PRIORITY

This application claims priority under 35 U.S.C. § 119(a) to Korean Patent Application Serial No. 10-2015-0186506 which was filed on Dec. 24, 2015, in the Korean Intellectual Property Office, the entire disclosure of which is incorporated herein by reference.

BACKGROUND

1. Field of the Disclosure

The present disclosure generally relates to an electronic device, and more particularly, to techniques for handling touch events occurring when a user manipulates an electronic device.

2. Description of the Related Art

Typical electronic devices such as smartphones and tablet computers have a touch screen panel (TSP). Such an electronic device may recognize a touch input on the display.

Unintended touch input may occur depending on the manner of gripping the electronic device. For example, when the user grips a smartphone with the left hand, the thumb or one of the fingers may generate touch input in the left or right edge regions of the display. In some cases, unintended touch input may be prevented by using special structures, such as rounded sides, perpendicular orientation between the side surface and front surface, and a bezel.

There has been disclosed a prototype smartphone having a display whose right side may be extended as a curved display. In addition, other electronic devices having curved displays have been commercially available.

With advances in flexible or curved display technologies, it is possible to provide electronic devices whose display may be extended toward the edge region. When an existing touch input scheme is applied to such an electronic device, if the user grips the electronic device in a traditional manner, an unintended touch input may occur in the edge region.

For example, in the case of an electronic device equipped with a side or rear display, if a running application supports multi-touch (two points of contact), the electronic device may properly handle touch input with two different touch points. However, when the user makes a multi-touch gesture with different touch points while unintended touch input occurs in the side or rear display, the electronic device may be unable to properly handle touch input with more than a specified number of touch points (e.g. two).

SUMMARY

Aspects of the present disclosure address at least the above mentioned problems and/or disadvantages and provide at least the advantages described below. Accordingly, an aspect of the present disclosure is to provide a touch processing method that enables an electronic device to process touch events in consideration of a user's intention.

In accordance with another aspect of the present disclosure, there is provided a touch processing method that enables an electronic device to process touch events in consideration of a user's intention by removing an unintended touch event or storing a touch event detected in a specific region. Thereby, it is possible to enhance user convenience.

In accordance with an aspect of the present disclosure, an electronic device is provided. The electronic device includes a housing that includes a first surface oriented in a first direction, and a second surface extending from the edge of the first surface in a second direction different from the first direction and being narrower than the first surface, a touchscreen display including a touch panel, and having a first section exposed through the first surface and a second section exposed through the second surface, a processor electrically connected with the touchscreen display, and a memory electrically connected with the processor. The memory stores instructions that cause, when executed, the processor to activate the touch panel, to detect a first touch event on one of the first section and the second section of the touchscreen display, to detect a second touch event on the other section after detection of the first touch event, to remove one of the first touch event and the second touch event, and to perform a function according at least partly to the remaining touch event.

In accordance with another aspect of the present disclosure, an electronic device is provided. The electronic device includes a housing that includes a first surface oriented in a first direction, and a second surface extending from the edge of the first surface in a second direction different from the first direction and being narrower than the first surface, a touchscreen display including a touch panel, and having a first section exposed through the first surface and a second section exposed through the second surface, a processor placed in the housing and electrically connected with the touchscreen display, and a memory electrically connected with the processor. The memory may store instructions that cause, when executed, the processor to activate the touch panel, to detect a first touch event on a first region of the second section of the touchscreen display, to detect a second touch event on a second region of the second section different from the first region after detection of the first touch event, and to determine whether to use at least one of the first touch event and the second touch event while deleting the touch event not to be used.

In accordance with another aspect of the present disclosure, there is provided a method of touch event processing for an electronic device. The method includes activating a touchscreen display including a touch panel, detecting a first touch event on one of a first section and a second section of the touchscreen display, detecting a second touch event on the other section of the touchscreen display after detection of the first touch event, and removing one of the first touch event and the second touch event, and performing a function according at least partly to the remaining touch event.

In accordance with another aspect of the present disclosure, there is provided a method of touch event processing for an electronic device. The method includes activating a touchscreen display including a touch panel, detecting a first touch event on a first region of the second section of the touchscreen display, detecting a second touch event on a second region of the second section different from the first region after detection of the first touch event, and determining whether to use at least one of the first touch event and the second touch event while deleting the touch event not to be used.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 9A to 9D are flowcharts of a method for processing touch events, according to an embodiment of the present disclosure;

DETAILED DESCRIPTION

Figure 1:
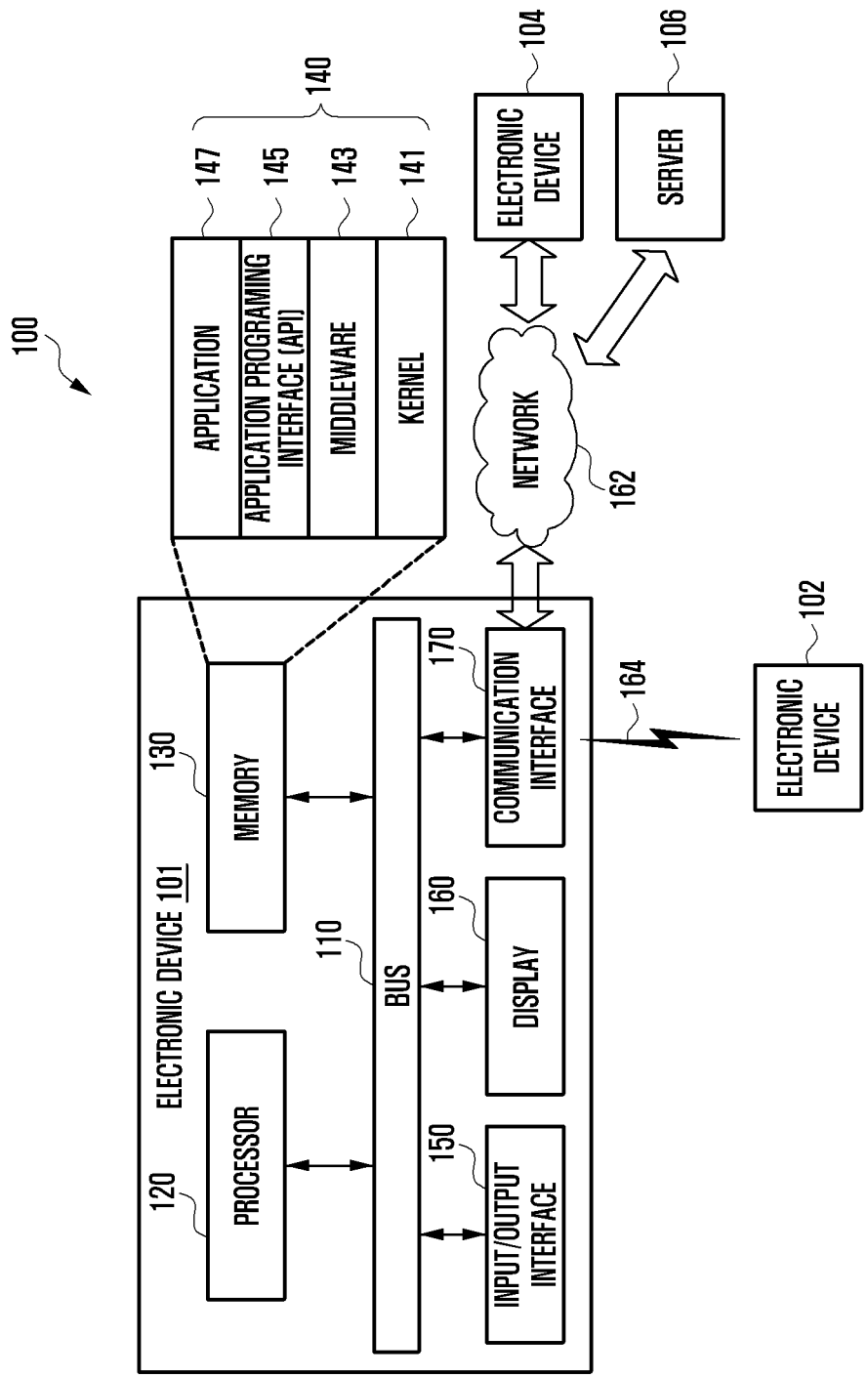
FIG. 1 illustrates a network environment including electronic devices, according to an embodiment of the present disclosure.

The following description, with reference to the accompanying drawings, is provided to assist in a comprehensive understanding of an embodiment of the present disclosure as defined by the claims and their equivalents. It includes various specific details to assist in that understanding but are to be regarded as merely exemplary. Accordingly, those of ordinary skill in the art will recognize that various changes and modifications of the embodiments described herein may be made without departing from the scope and spirit of the present disclosure. In addition, descriptions of well-known functions and constructions may be omitted for clarity and conciseness.

Expressions such as "include" and "may include" which may be used in the present disclosure denote the presence of the disclosed functions, operations, and constituent elements and do not limit one or more additional functions, operations, and constituent elements. In the present disclosure, terms such as "include" and/or "have" may be construed to denote a certain characteristic, number, step, operation, constituent element, component or a combination thereof, but may not be construed to exclude the existence of, or a possibility of, the addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element may be referred to as a second element, and similarly, a second element may also be referred to as a first element without departing from the scope of the present disclosure.

In the case where a component is referred to as being "connected" to, or "accessed" by another component, it should be understood that not only is the component directly connected to or accessed by the other component, but there may also exist another component between them. Meanwhile, in the case where a component is referred to as being "directly connected" or "directly accessed" to another component, it should be understood that there is no component therebetween.

The terms used in the present disclosure are only used to describe specific embodiments, and do not limit the present disclosure. As used herein, the singular forms are intended to include the plural forms as well, unless the context clearly indicates otherwise.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HIVID)) such as electronic eyeglasses, electronic clothes, an electronic bracelet, an electronic necklace, an electronic appcessory, or a smart watch).

According to an embodiment of the present disclosure, an electronic device may be a smart home appliance that involves a communication function. For example, an electronic device may be a TV, a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

Other embodiments of the electronic device include various medical devices (for example, various kinds of portable medical measuring device (blood glucose meter, heart rate meter, blood pressure meter, or a temperature measuring instrument, etc.), magnetic resonance angiography (MRA), magnetic resonance imaging (MM), computed tomography (CT), camcorder, etc.), navigation (navigation) devices, global positioning system receiver (GPS) receiver, EDR (event data recorder), flight data recorder (FDR), automotive infotainment (infotainment) devices, marine electronic equipment (e.g., marine navigation systems, gyrocompass, etc.), aviation electronics (avionics), security devices, automotive head unit (head unit), industrial or household robots, financial institutions, automatic teller machine (ATM), point of sales (POS) terminals, or Internet of Things (IoT) devices (e.g. light bulbs, various sensors, electric or gas meters, sprinkler systems, fire alarms, thermostat, street lights, toaster, fitness equipment, hot water tank, a heater, a boiler, etc.).

According to an embodiment of the present disclosure, an electronic device may be furniture or a building/structure of the portion, an electronic board, an electronic sign-receiving device (electronic signature receiving device), a projector, or various measuring devices (e.g. water, electricity, gas, or a radio wave measuring equipment, etc.). The electronic device may be one or more combinations of the various devices described above. The electronic device may be a flexible electronic device. In addition, an electronic device is not limited to the above-described device, and may include a new electronic device, in accordance with new technological developments. In this document, the term user refers to a human or an electronic device using the electronic device (for example, an artificial intelligence electronic device).

FIG. 1 is a block diagram illustrating a network environment 100 including an electronic device 101 in accordance with an embodiment of the present disclosure. Referring to FIG. 1, the electronic device 101 includes a bus 110, a processor 120, a memory 130, an input/output interface 150, a display 160, and a communication interface 170.

The bus 110 may be a circuit designed for connecting the above-discussed elements and communicating data (e.g., a control message) between such elements.

The processor 120 may receive commands from the other elements (e.g., the memory 130, the input/output interface 150, the display 160, or the communication interface 170, etc.) through the bus 110, interpret the received commands, and perform arithmetic or data processing based on the interpreted commands.

The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 may be used by one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may deliver commands or data, entered by a user through an input/output unit (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display. The display 160 may display various types of content (e.g., text, images, videos, icons, or symbols) for users. The display module 160 may include a touch screen, and may receive, for example, a touch, gesture, proximity, or hovering input by using an electronic device or a part of the user's body.

The communication interface 170 may perform communication between the electronic device 101 and the electronic device 104 or the server 106. For example, the communication interface 170 may communicate with any external device by being connected with a network 162 through a wired or wireless communication.

The wireless communication may include, but not limited to, at least one of wireless fidelity (WiFi), Bluetooth (BT), near field communication (NFC), global navigation satellite system (GNSS), or a cellular communication (e.g., machine type communications (MTC), fifth generation (5G), long term evolution (LTE), long term evolution advanced (LTE-A), code division multiple access (CDMA), wideband code division multiple access (WCDMA), universal mobile telecommunications system (UMTS), wireless broadband (Wi-Bro), global system for mobile communications (GSM), etc.). The GNSS may include at least one of global positioning system (GPS), global navigation satellite system (Glonass), Beidou navigation satellite system (Beidou), Galileo, or the European global satellite-based navigation system. Hereinafter, the terms "GPS" and the "GNSS" may be interchangeably used herein. The wired communication may include, at least one of universal serial bus (USB), high definition multimedia interface (HDMI), RS-232 (recommended standard 232), or plain old telephone service (POTS). The network 162 includes, as a telecommunications network at least one of a computer network (e.g., local area network (LAN) or wide area network (WAN)), the Internet, and a telephone network.

The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102, 104 or the server 106. In the case where the electronic device 101 performs a certain function or service automatically or in response to a request, the electronic device 101 may request at least a portion of functions related to the function or service from another electronic device 102, 104 or the server 106 instead of, or in addition to, performing the function or service for itself. The other electronic device 102, 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
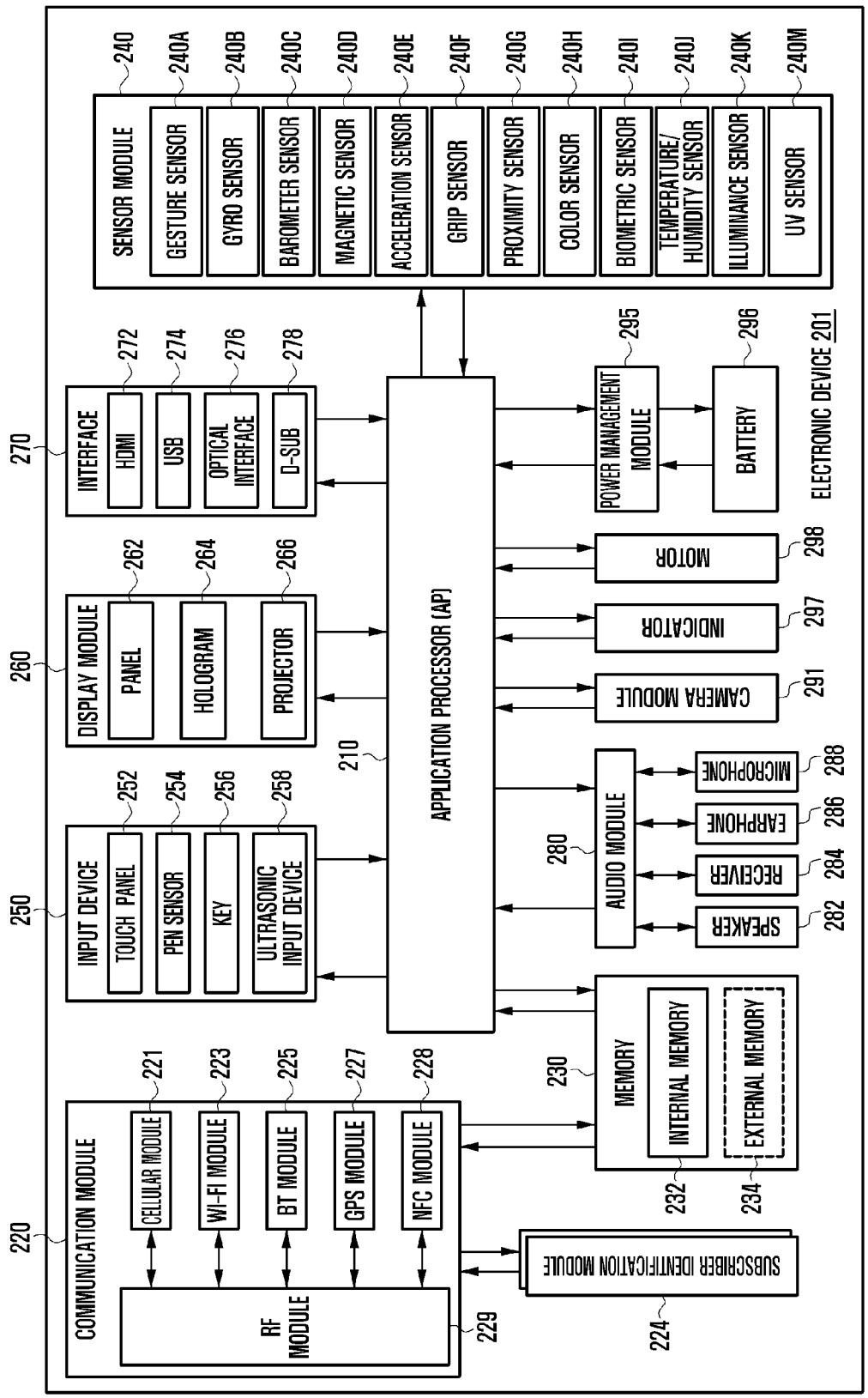
FIG. 2 is a block diagram of an electronic device, according to an embodiment of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 includes at least one application processor (AP) 210, a communication module 220, a subscriber identification module (SIM) card 224, a memory 330, a sensor module 240, an input unit 350, a display 360, an interface 370, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of a system-on-chip (SoC), for example. According to an embodiment of the present disclosure, the AP 210 may further include a graphic processing unit (GPU).

The communication module 220 (e.g., the communication interface 170) may perform data communication with the electronic device 104 or the server 106 connected to the electronic device 201 (e.g., the electronic device 101) through the network. According to an embodiment of the present disclosure, the communication module 220 may include therein a cellular module 221, a WiFi module 223, a BT module 225, a GNSS module 227, an NFC module 228, and an RF (radio frequency) module 229.

The cellular module 221 may offer a voice call, a video call, a message service, an internet service, and the like through a communication network (e.g., machine type communications (MTC), fifth generation (5G), long term evolution (LTE), long term evolution advanced (LTE-A), code division multiple access (CDMA), wideband code division multiple access (WCDMA), universal mobile telecommunications system (UMTS), wireless broadband (WiBro), global system for mobile communications (GSM), wireless fidelity (Wi-Fi), Bluetooth, and near field communications (NFC) etc.). Additionally, the cellular module 221 may perform identification and authentication of the electronic device in the communication network, using the SIM card 224. According to an embodiment of the present disclosure, the cellular module 221 may perform at least part of functions the AP 210 may provide. For example, the cellular module 221 may perform at least part of a multimedia control function. Each of the WiFi module 223, the BT module 225, the GNSS module 227 and the NFC module 228 may include a processor for processing data transmitted or received. Although FIG. 2 shows the cellular module 221, the WiFi module 223, the BT module 225, the GNSS module 227 and the NFC module 228 as different blocks, at least part of them may be contained in a single IC (integrated circuit) chip or a single IC package.

The RF module 229 may transmit and receive data, e.g., RF signals or any other electric signals. The RF module 229 may include a transceiver, a PAM (power amp module), a frequency filter, an LNA (low noise amplifier), and the like. Although FIG. 2 shows that the cellular module 221, the WiFi module 223, the BT module 225, the GNSS module 227 and the NFC module 228 share the RF module 229, at least one of them may perform transmission and reception of RF signals through a separate RF module.

The SIM card 224 may include, for example, an embedded SIM including a user identification module, and may include unique identification information (e.g., an integrated circuit card identifier (ICCID)) or subscriber information (e.g., international mobile subscriber identity (IMSI)).

The memory 230 includes an internal memory 232 and an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-secure digital (micro-SD), a mini-secure digital (mini-SD), an extreme digital (xD), a memory stick, and the like. The external memory 234 may be functionally connected to the electronic device 201 through various interfaces.

The sensor module 240 may measure physical quantity or sense an operating status of the electronic device 201, and then convert measured or sensed information into electric signals. The sensor module 240 includes, for example, at least one of a gesture sensor 240A, a gyro sensor 240B, an atmospheric sensor 240C, a magnetic sensor 240D, an acceleration sensor 240E, a grip sensor 240F, a proximity sensor 240G a color sensor 240H (e.g., RGB (red, green, blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 240 may include a control circuit for controlling one or more sensors equipped therein.

The input unit 250 includes a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user. The pen sensor 254 (e.g., a digital pen sensor), for example, may be implemented by using a method identical or similar to a method of receiving a touch input from the user, or by using a separate sheet for recognition. For example, a key pad or a touch key may be used similar to the keys 256. The ultrasonic input unit 258 enables the terminal to sense a sound wave by using a microphone 288 of the terminal through a pen generating an ultrasonic signal, and to identify data.

The display 260 (e.g., the display 150) includes a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include, for example, an HDMI (high-definition multimedia interface) 272, a USB (universal serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (mobile high-definition link) interface, an SD (secure digital) card/MMC (multi-media card) interface, or an IrDA (infrared data association) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment of the present disclosure, the camera module 291 may include at least one image sensor (e.g., a front sensor or a rear sensor), a lens, an ISP (image signal processor, not shown), or a flash (e.g., LED or xenon lamp, not shown).

The power management module 295 may manage electric power of the electronic device 201. The power management module 295 may include, for example, a PMIC (power management integrated circuit), a charger IC, or a battery charge gauge. The PMIC may be implemented by, for example, an IC or an SoC semiconductor. Charging methods may be classified into a wired charging method and a wireless charging method. A wireless charging type may include, for example, a magnetic resonance type, a magnetic induction type, or an electromagnetic type. Any additional circuit for wireless charging may be further used such as a coil loop, a resonance circuit, or a rectifier. The battery gauge may measure the residual charge amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. The electronic device 201 may include a specific processor (e.g., GPU) for supporting a mobile TV. This processor may process media data that comply with standards of DMB (digital multimedia broadcasting), DVB (digital video broadcasting), or MediaFlo.

Each of the above-discussed elements of the electronic device disclosed herein may be formed of one or more components, and its name may vary according to the type of the electronic device. The electronic device disclosed herein may be formed of at least one of the above-discussed elements without some elements or with additional other elements. Some of the elements may be integrated into a single entity that still performs the same functions as those of such elements before being integrated.

Figure 3:
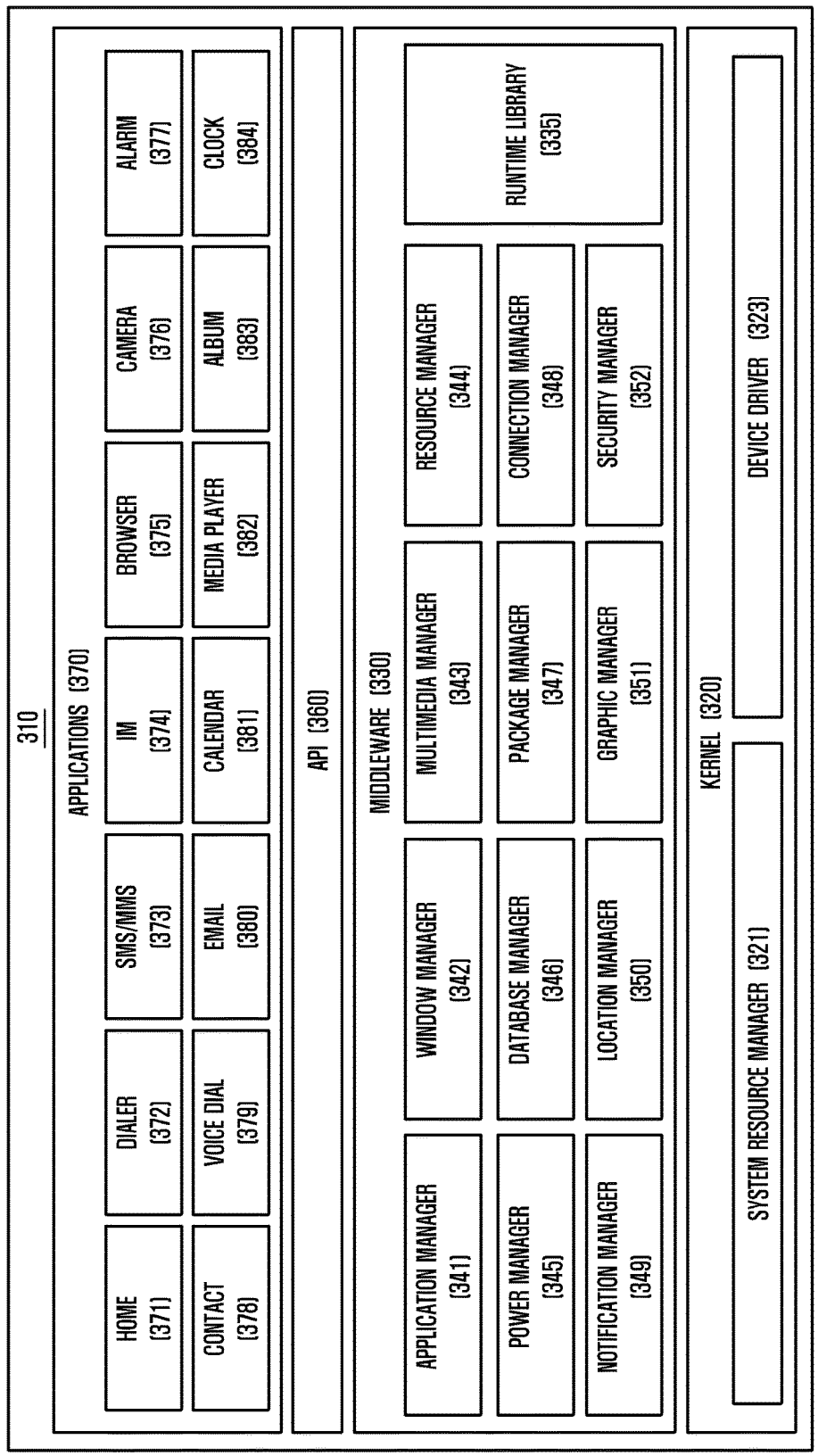
FIG. 3 is a block diagram of a program module, according to an embodiment of the present disclosure.

FIG. 3 is a block diagram illustrating a program module, according to an embodiment of the present disclosure.

Referring to FIG. 2, a program module 310 (e.g., the program 140) may include an operating system (OS) controlling resources related to the electronic device (e.g., the electronic device 101) and/or various applications (e.g., the application 147) that are driven on the operating system. The operating system may include, e.g., Android™, iOS™, Windows™ Symbian™, Tizen™, or Bada™.

The program module 310 includes a kernel 320, middleware 330, an API 360, and/or an application 370. At least a part of the program module 310 may be preloaded on the electronic device or may be downloaded from the electronic device 104 or the server 106.

The kernel 320 (e.g., the kernel 141 of FIG. 1) may include, e.g., a system resource manager 321 and/or a device driver 323. The system resource manager 321 may perform control, allocation, or recovery of system resources and may include a process managing unit, a memory managing unit, and/or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. The middleware 330 (e.g., middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler to add a new function through a programming language while, e.g., the application 370 is being executed. The runtime library 335 may perform input/output management, memory management, and/or arithmetic functions.

The application manager 341 may manage the life cycle of at least one application of, e.g., the applications 370. The window manager 342 may manage graphical user interface (GUI) resources used on the screen. The multimedia manager 343 may determine formats necessary to play various media files and use a codec appropriate for a format to perform encoding or decoding on media files. The resource manager 344 may manage resources, such as source code of at least one of the applications 370, memory and/or storage space.

The power manager 345 may operate together with, e.g., a basic input/output system (BIOS) to manage battery or power and provide power information necessary for operating the electronic device. The database manager 346 may generate, search, and/or query a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as an incoming message, appointment, and/or proximity notification without interfering with the user. The location manager 350 may manage location information on the electronic device. The graphic manager 351 may manage graphic effects to be offered to the user and their related user interface. The security manager 352 may provide various security functions necessary for system security and/or user authentication. When the electronic device (e.g., the electronic device 101) has telephony capability, the middleware 330 may further include a telephony manager for managing voice call and/or video call functions of the electronic device. The middleware 330 may include various functions of the above-described components. The middleware 330 may provide a specified module per type of operating system to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) includes one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar level), and/or environmental information (e.g., provision of air pressure, moisture, or temperature information). The application 370 may include information exchanging application supporting information exchange between the electronic device (e.g., the electronic device 101) and an external electronic device 102 and 104. Examples of the information exchange application may include, but is not limited to, a notification relay application for transferring specific information to the external electronic device, or a device management application for managing the external electronic device. For example, a notification relay application may include a function for relaying notification information generated from other applications of the electronic device (e.g., the SMS/MMS application, the email application, the health-care application, or the environmental information application) to the external electronic devices 102 and 104. Further, the notification relay application may receive notification information from, e.g., the external electronic device and may provide the received notification information to the user. A device management application may perform at least some functions of the external electronic device 102 or 104 such as, for example, turning on/off the external electronic device (or some components of the external electronic device), control brightness (or resolution) of the display, etc. The device management application may manage (e.g., install, delete, or update) an application operating in the external electronic device or a service (e.g., call service or message service) provided from the external electronic device.

The application 370 may include an application (e.g., a health-care application) selected depending on the attribute (e.g., as an attribute of the electronic device, the type of electronic device is a mobile medical device) of the external electronic device 102 and 104. The application 370 may include an application received from the server 106 or electronic devices 102 and 104. The application 370 may include a preloaded application or a third party application downloadable from a server. The names of the components of the program module 310 may be vary depending on the type of operating system. At least a part of the program module 310 may be implemented in software, firmware, hardware, or in a combination of two or more thereof. At least a part of the programming module 310 may be implemented (e.g., executed) by e.g., a processor (e.g., the AP 310). At least a part of the program module 310 may include e.g., a module, a program, a routine, a set of instructions, a process, and the like for performing one or more functions.

The term "module" as used in this disclosure may refer to a certain unit that includes one of hardware, software and firmware or any combination thereof. The term module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (application-specific integrated circuit) chip, FPGAs (field-programmable gate arrays), and programmable-logic device, which have been known or are to be developed.

According to an embodiment of the present disclosure, an electronic device includes a housing that includes a first surface in a first direction, and a second surface extending from the edge of the first surface in a second direction different from the first direction and being narrower than the first surface, a touchscreen display including a touch panel, and having a first section exposed through the first surface and a second section exposed through the second surface, a processor placed in the housing and electrically connected with the touchscreen display, and a memory electrically connected with the processor. The memory may store instructions that cause, when executed, the processor to activate the touch panel, to detect a first touch event on one of the first section and the second section of the touchscreen display, to detect a second touch event on the other remaining section after detection of the first touch event, to remove one of the first touch event and the second touch event, and to perform a function according at least partly to the other remaining touch event.

According to an embodiment of the present disclosure, the second surface may be partially bent. The first surface may include a first side of a first length, a second side of a second length longer than the first length, a third side of the first length, and a fourth side of the second length, wherein the first side is perpendicular to the second side and the fourth side and is parallel with the third side, and wherein the edge of the second surface contains the second side.

According to an embodiment of the present disclosure, the second section of the touchscreen display may be extended from the edge of the first section. The first surface may be a flat surface. The instructions may cause the processor to determine one of the first touch event and the second touch event detected on the first section to be a valid touch event, to perform a function according at least partly to the touch event detected on the first section, and to remove the other touch event detected on the second section.

According to an embodiment of the present disclosure, when a first touch event is detected on the second section and a second touch event is detected on the first section, the electronic device may remove the first touch event and perform a function according at least partly to the second touch event. When a first touch event is detected on the first section and a second touch event is detected on the second section, the instructions may cause the processor to remove the second touch event and to perform a function according at least partly to the first touch event.

According to an embodiment of the present disclosure, an electronic device includes a housing that includes a first surface in a first direction, and a second surface extending from the edge of the first surface in a second direction different from the first direction and being narrower than the first surface, a touchscreen display including a touch panel, and having a first section exposed through the first surface and a second section exposed through the second surface, a processor placed in the housing and electrically connected with the touchscreen display, and a memory electrically connected with the processor. The memory may store instructions that cause, when executed, the processor to activate the touch panel, to detect a first touch event on a first region of the second section of the touchscreen display, to detect a second touch event on a second region of the second section different from the first region after detection of the first touch event, and to determine whether to use either one or both of the first touch event and the second touch event for device operation.

According to an embodiment of the present disclosure, when both the first touch event and the second touch event constitute a gesture event, the instructions may cause the processor to use both events for device operation. The instructions may cause the processor to determine at least one of the first touch event and the second touch event constituting a gesture event, and to perform a function according at least partly to the determined touch event. The second touch event may correspond to a touch gesture involving movement from the touch point of the first touch event without touch-release.

Figure 4A:
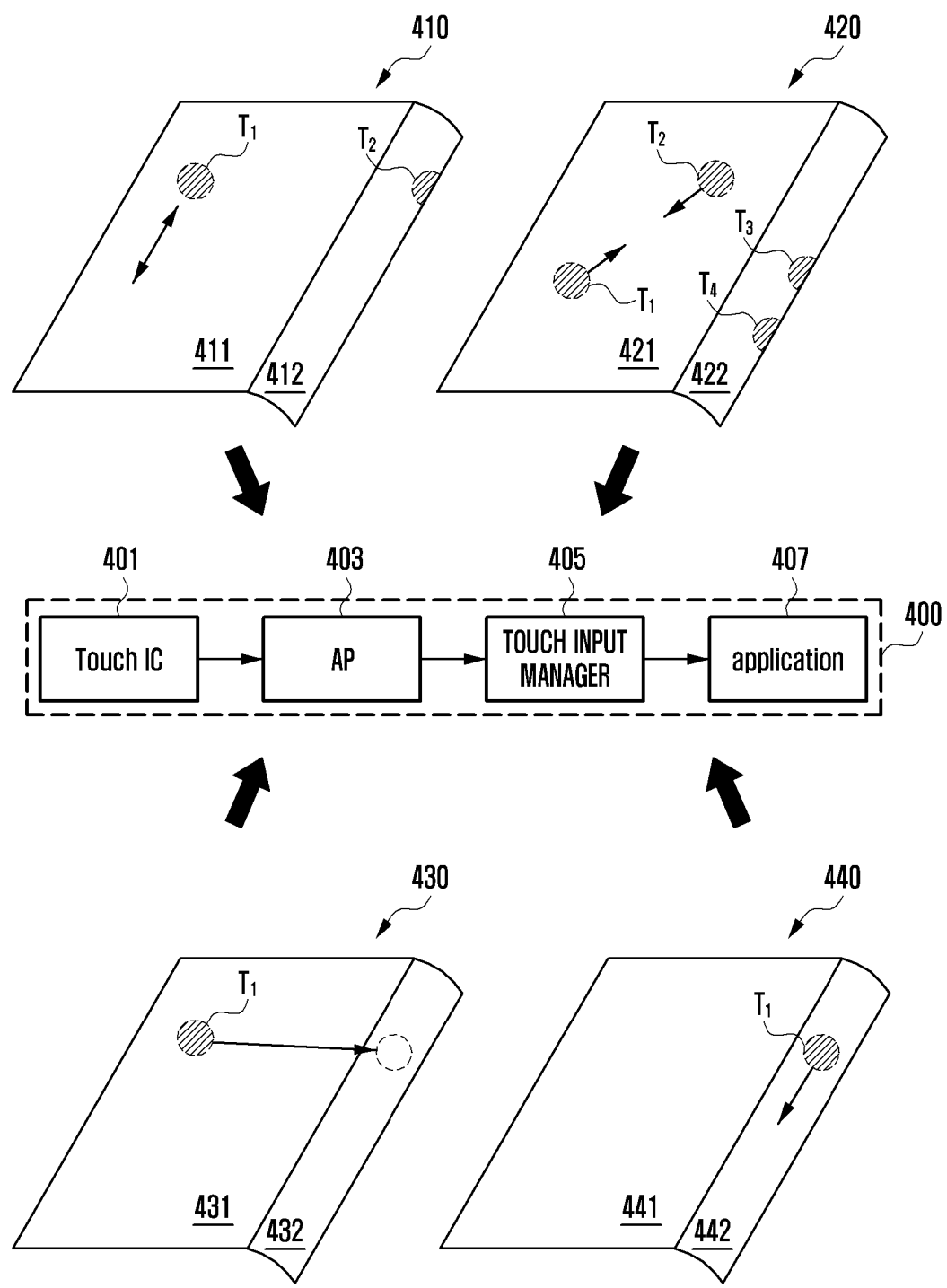
FIGS. 4A and 4B illustrate processing of touch events occurring in an electronic device, according to an embodiment of the present disclosure.
Figure 4B:
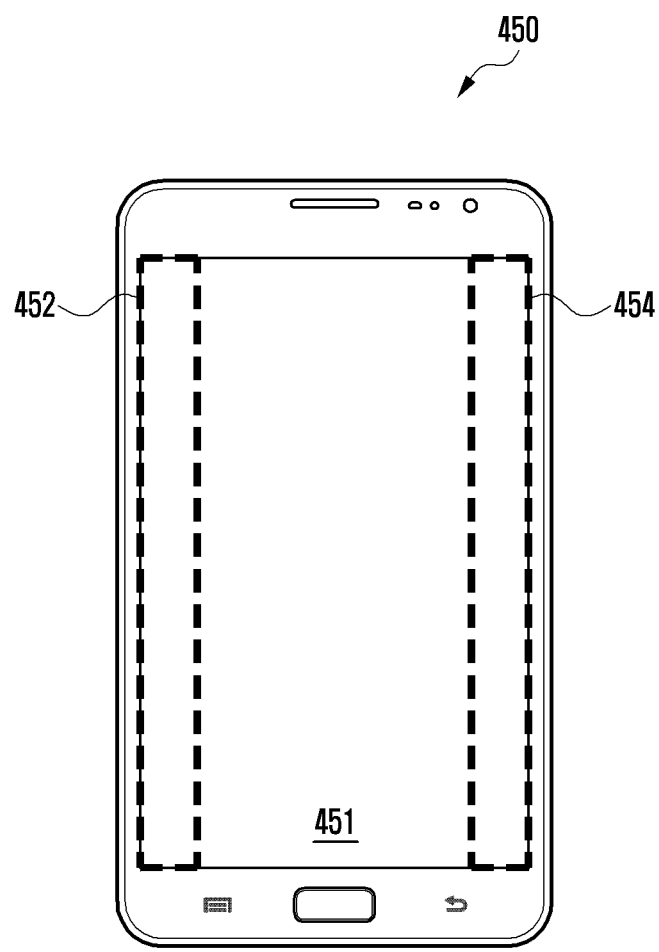

FIGS. 4A and 4B illustrate processing of touch events occurring in the electronic device, according to an embodiment of the present disclosure.

Referring to FIG. 4A, the display of the electronic device may include two or more areas. For example, as indicated by reference numeral 410, the display includes a flat display area 411 and a curved display area 412 at the right side. For ease of description, components of the electronic device other than the display are not shown.

According to an embodiment of the present disclosure, the display of the electronic device may be functionally divided into two or more areas. For example, as indicated by reference numeral 410, while the display area 411 and display area 412 are on the same display panel, they may be functionally different. That is, the display area 411 may be used for executing applications (e.g. messaging application, schedule application, and Internet application), and the display area 412 may be used for displaying icons associated with frequently used applications.

According to an embodiment of the present disclosure, areas of the display may be divided in various ways on the basis of multiple criteria. For example, the display may be divided into a main area and a sub area, a flat area and a curved area, a front area and a side area, a front area and a rear area, a visible area and an invisible area with respect to the viewing angle, or other areas according to a combination of three or more criteria. The display may also be divided into a first area and a second area. In the following description, the first area may indicate a display area that is used to execute a application or is used to make an intended touch gesture, and the second area may indicate a display area on which unintended touch input may occur. However, the present disclosure is not limited thereto.

In the description, the word "display" may refer to a display supporting a touch feature. Such a display may be of various types, including an add-on type display (the touch screen panel (TSP) is added on the LCD panel), an on-cell type display (the TSP is embedded in the LCD panel), and an in-cell type display (the touch function is embedded in LCD panel).

According to an embodiment of the present disclosure, as shown in the drawing, a touch event detected on the display may be processed according to a process 400 in the electronic device. A touch event may be detected according to a capacitance change occurring in the touch panel of the display, and may correspond to a down event, up event, continued event, or multi-touch event. A down event may occur when the user presses the touch panel with an input means such as a finger or touch pen. An up event may occur when the user releases the input means from the touch panel after generating a down event. A continued event may occur when the user moves the input means on the touch panel without releasing the input means after generating a down event. Such a continued event may correspond to dragging. A multi-touch event may occur when the user presses the touch panel at two or more points.

According to an embodiment of the present disclosure, when a touch event occurs, the touch IC 401 may identify the generation, type and position of the touch event. The application processor (AP) 403 may identify the functional area of the display to which the touch position belongs, and send the touch input manager 405 information regarding at least one of the generation, type, position, and functional area for the touch event.

Upon reception of touch event information, the touch input manager 405 may determine how to process the touch event on the basis of at least one of the type, position, and functional area for the touch event. More specifically, the touch input manager 405 may determine whether to store the touch event, to remove the touch event, or to transfer the touch event to the corresponding application 407. For example, if the touch event is a down event detected on a specific area, the touch input manager 405 may further determine whether the touch event is associated with gripping, and, if the touch event is associated with gripping, delete the touch event without further processing. Touch event handling is described in more detail later with reference to FIGS. 9A to 9D.

A description is given of processing of a touch event matching the user intention with reference to cases indicated by reference numerals 410, 420, 430 and 440 in FIG. 4A. In the following description, it is assumed that the areas 411, 421, 431 or 441 are display areas for application execution or the user entering touch input intentionally, and that the areas 412, 422, 432 or 442 are display areas on which unintended touch input is likely to occur. In FIG. 4A, reference numeral 410 indicates a situation where touch event T1 is followed by a drag action on the display area 411. At this time, unintended touch event T2 may occur owing to the user hand gripping the electronic device or an input means like an electronic pen. The touch IC 401 may detect touch events T1 and T2 and provide the AP 403 with information on touch positions thereof.

The AP 403 may determine the display area on which each of touch event T1 and touch event T2 has occurred. For example, the AP 403 may determine that touch event T1 has occurred on the area 411 and touch event T2 has occurred on the area 412.

The AP 403 may transfer touch event T2 to the touch input manager 405. Specifically, the AP 403 may provide the touch input manager 405 with information on the type, position, and display area for touch event T2. Upon reception of information indicating that touch event T2 has occurred on the area 412, the touch input manager 405 may check whether touch event T2 is associated with gripping.

For example, for touch event T2, when the difference between the major axis and the minor axis of the contact region is less than or equal to a preset threshold, the touch input manager 405 may regard the contact region as a circular shape and determine that touch event T2 is a valid touch. When the difference between the major axis and the minor axis of the contact region is greater than the preset threshold, the touch input manager 405 may regard the contact region as an elliptical shape and determine that touch event T2 is associated with gripping. This is described in more detail later in connection with FIG. 8. In addition, the touch input manager 405 may determine whether a touch event is a valid touch or is associated with gripping on the basis of the area of the contact region or the contact duration.

For example, upon determining that touch event T2 is associated with gripping, the touch input manager 405 may remove touch event T2 without further processing. As another example, although touch event T2 is determined as a valid touch, as touch event T2 has occurred on the area 412, the touch input manager 405 may temporarily store touch event T2 without immediately transferring it to the application 407.

Thereafter, the AP 403 may transfer touch event T1 to the touch input manager 405. Here, the AP 403 may also provide information indicating that touch event T1 has occurred on the area 411. Upon recalling that touch event T2 is stored, the touch input manager 405 may remove touch event T2 and transfer only touch event T1 to the application 407. As a result, scroll operation may be successfully performed in response to touch event T1.

In FIG. 4A, reference numeral 420 indicates a situation where a multi-touch function is performed for image reduction through touch events T1 and T2 occurring on the display area 421. At this time, unintended touch events T3 and T4 may occur owing to the user hand gripping the electronic device or an input means like an electronic pen. In this case, upon determining that touch events T3 and T4 are associated with gripping, the touch input manager 405 may remove touch events T3 and T4. Although determining that touch events T3 and T4 are a valid touch owing to a circular or small contact region, the touch input manager 405 may temporarily store touch events T3 and T4 without immediately transferring them to the application 407. Thereafter, upon receiving touch events T1 and T2 detected on the area 421, the touch input manager 405 may remove stored touch events T3 and T4 and forward only touch events T1 and T2 to the application 407. As a result, touch events T1 and T2 may be processed successfully according to the user's intention.

In FIG. 4A, reference numeral 430 indicates a situation where touch event T1 is followed by a drag action from the area 431 to the area 432. After detecting touch event T1, the touch input manager 405 may repeatedly transfer information on extended touch input occurring on the area 431 to the application 407 but may store information on touch input occurring on the area 432 without immediately transferring the information to the application 407. Thereafter, when touch input does not occur on the area 432 for a given length of time or distance, the touch input manager 405 may remove the stored information on touch input detected on the area 432. Thus, when touch event T1 is extended from the area 431 to the area 432, the touch input manager 405 may temporarily store touch input detected on the area 432 without immediately transferring it to the application 407, preventing malfunction due to an unintended user action.

In FIG. 4A, reference numeral 440 indicates a situation where touch event T1 is followed by a drag action on the area 442 (e.g. scrolling). The area 442 may be used for adjusting screen brightness or sound volume. When touch event T1 occurs on the area 442, the touch input manager 405 may temporarily store touch event T1 and, if subsequent touch input is repeatedly detected for a given length or more of time or distance, transfer touch event T1 as a continued event to the application 407. If subsequent touch input is not repeatedly detected for the given length of time or distance, the touch input manager 405 may regard touch event T1 as an unintended touch and remove touch event T1. According to an embodiment of the present disclosure, to prevent touch malfunction on a region close to the bezel, it is possible to filter out unintended touch events on the basis of the movement distance associated with touch input without configuring a strict region where touch input is to be ignored. Various other embodiments are described later. FIG. 4A depicts some of input patterns available to the electronic device, and the present disclosure is not limited thereto.

The hardware and software components shown in FIG. 4A may be represented in various ways. For example, the touch IC 401 recognizing the occurrence and position of a touch event may be named as an input recognizer. The AP 403 may be named as a processor, controller, or control unit. A touch event may occur owing to not only direct contact with a display area but also indirect proximity input. The application 407 may indicate an application being currently executed or an application to be executed by a touch event. The application 407 may be executed at the application layer.

Referring to FIG. 4B, as indicated by reference numeral 450, the display may be divided into a first area 451 and second areas 452 and 454. In the above division, the first area may indicate a display area that is used to execute an application or is used by the user to make a touch gesture intentionally, and the second area may indicate a display area on which unintended touch input is likely to occur. The touch input manager 405 may handle a touch event detected on the area 452 or 454 in a manner identical to that used for a touch event detected on the areas 412, 422, 432 or 442, and may handle a touch event detected on the area 451 in a manner identical to that used for a touch event detected on the areas 411, 421, 431 or 441.

Figure 5:
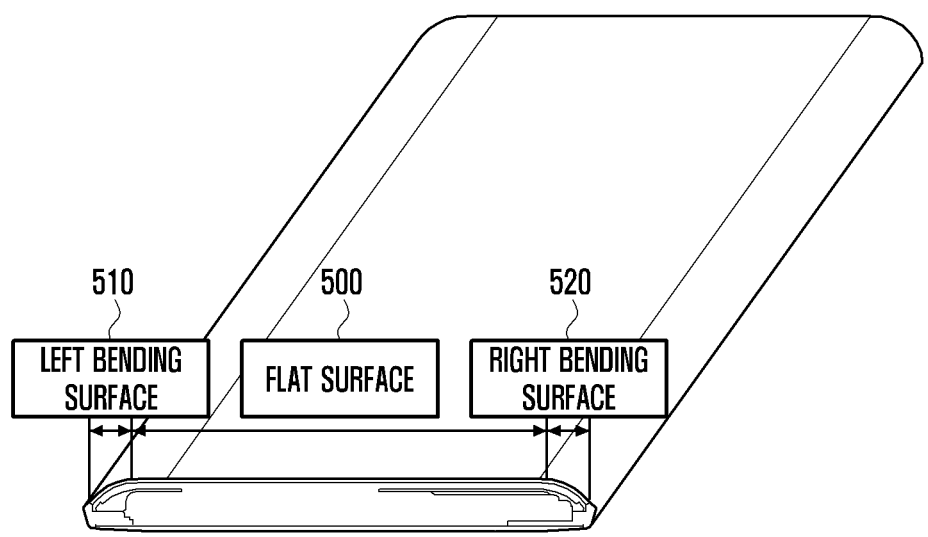
FIG. 5 illustrates a display configuration of an electronic device, according to an embodiment of the present disclosure.

FIG. 5 illustrates a display configuration of the electronic device, according to an embodiment of the present disclosure.

In an embodiment of the present disclosure, the electronic device may be a multi-surface display device having multiple display surfaces on the front. For example, the display of the electronic device may include a first display on the flat surface 500 on the front, a second display on the left bending surface 510 on the front, and a third display on the right bending surface 520 on the front. The first to third displays may have first to third directions, respectively. Here, the first to third directions may differ from each other. The area of the first display in which an image may be displayed may be referred to as the first display area; the area of the second display in which an image may be displayed may be referred to as the second display area; and the area of the third display in which an image may be displayed may be referred to as the third display area. The first to third displays may be concatenated with each other. For example, the third display may be extended from the first display or second display. Here, some of the third display area may be extended from the periphery of the first display area or second display area. At least one of the second display on the left bending surface 510 and the third display on the right bending surface 520 may be a curved display.

FIGS. 6A to 6D illustrate screen configurations of an electronic device with multiple displays, according to an embodiment of the present disclosure.

In an embodiment of the present disclosure, the first to third displays may separately operate to display different images or uniformly operate to display the same image in a concatenated manner under the control of the processor. The processor may execute an application program and provide a user interface on the display. The processor may also control screens displayed on the first to third displays in response to user input. A description is given below of various screens displayed on the first to third displays.

Figure 6A:
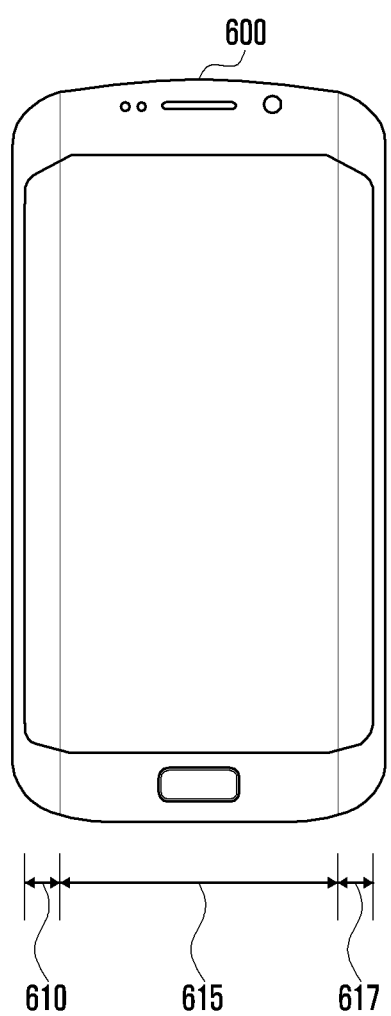
FIGS. 6A to 6D illustrate screen configurations of an electronic device with multiple displays, according to an embodiment of the present disclosure.

Referring to FIG. 6A, display areas of the first display 615, second display 610, and third display 617 may be used to display a single screen in a concatenated manner. That is, a single screen may be displayed on a concatenated display area covering the second display area of the second display 610, the first display area of the first display 615, and the third display area of the third display 617.

Figure 6B:
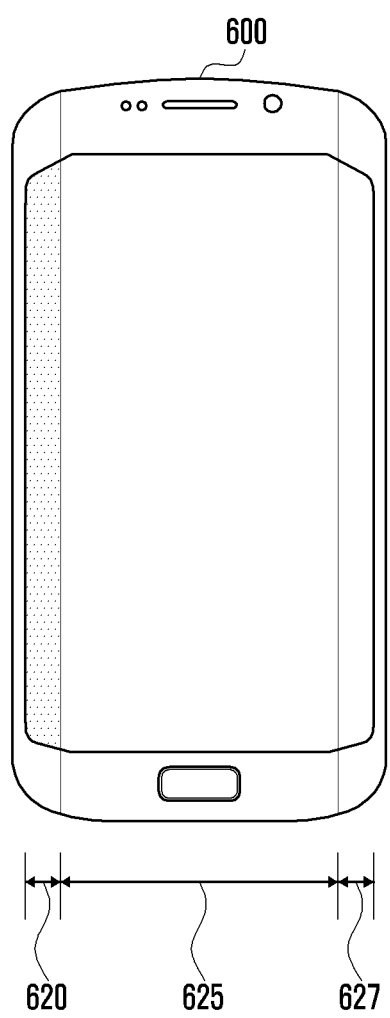

Referring to FIG. 6B, display areas of the first display 625 and third display 627 may be used to display a single screen in a concatenated manner, and the display area of the second display 620 may be used to display a separate screen. That is, one screen may be displayed on a concatenated display area covering the first display area of the first display 625 and the third display area of the third display 627, and another screen may be displayed on the second display area of the second display 620.

Figure 6C:
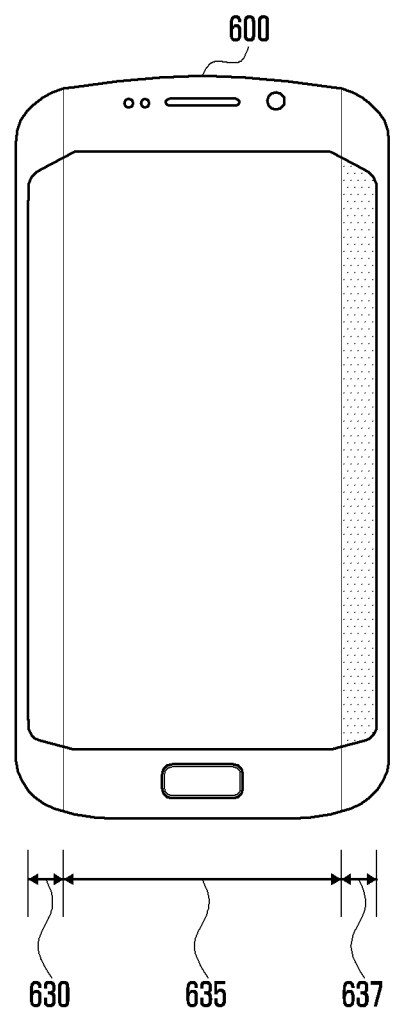

Referring to FIG. 6C, display areas of the first display 635 and second display 630 may be used to display a single screen in a concatenated manner, and the display area of the third display 637 may be used to display a separate screen. That is, one screen may be displayed on a concatenated display area covering the second display area of the second display 630 and the first display area of first display 635, and another screen may be displayed on the third display area of the third display 637.

Figure 6D:
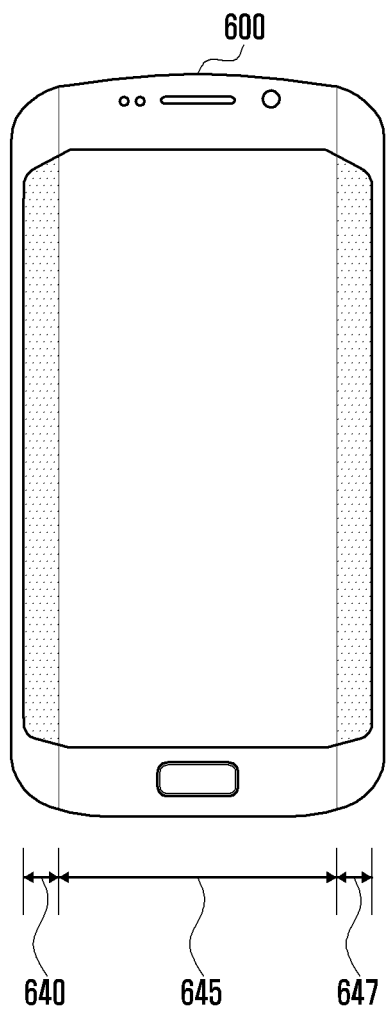

Referring to FIG. 6D, display areas of the first display 645, second display 640, and third display 647 may be used to display separate screens, respectively. That is, a first screen may be displayed on the first display area of the first display 645, a second screen may be displayed on the second display area of the second display 640, and a third screen may be displayed on the third display area of the third display 647.

Figure 7:
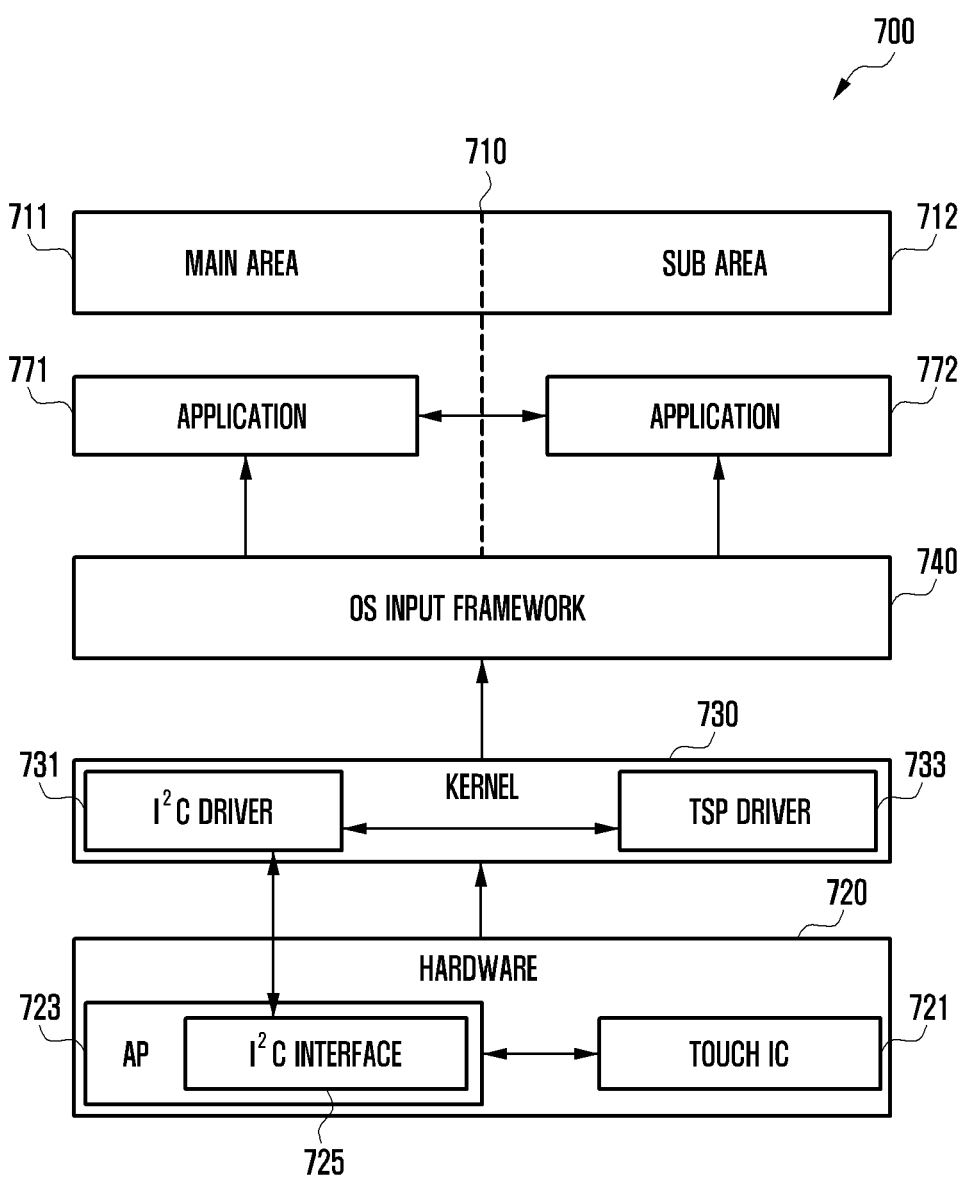
FIG. 7 is a block diagram for processing touch events, according to an embodiment of the present disclosure.

FIG. 7 illustrates an internal mechanism of the electronic device for processing touch input, according to an embodiment of the present disclosure.

Referring to FIG. 7, the electronic device 700 includes a display 710 supporting a touch function and a hardware unit 720 to handle touch input. The electronic device 700 may further include various layers to handle touch input above the kernel 730. For example, an OS input framework 740, and applications 771 and 772 are included.

In an embodiment of the present disclosure, the display 710 may be divided into a main area 711 and a sub area 712. The display 710 may be divided into a first area that is used to execute an application or is used by the user to make a touch gesture intentionally, and a second area on which unintended touch input is likely to occur. Such division is illustrative only. The display 710 may be functionally divided into a first area and a second area (the first area and second area may be physically interconnected). Here, the first area may have a flat surface, and the second area may have a curved surface extended from the first area. The first area may correspond to the main area 711, and the second area may correspond to the sub area 712.

The touch IC 721 may detect a touch event occurring on the display 710 and identify the position (coordinates) of the touch event. The touch IC 721 may identify the position of a touch event on the basis of a capacitance change of the touch panel. When the touch panel is implemented using resistive, infrared, or ultrasonic wave technology instead of capacitance technology, the touch IC 721 as a determination module may identify the position of a touch event on the basis of a change detectable in the corresponding technology. The touch IC 721 may also identify the position at which an event has occurred on the basis of display coordinate input (e.g. gesture, short range communication, remote communication data, or voice signal) provided by the modules shown in FIG. 2.

The touch IC 721 may send touch input to the AP 723 in the form of an interrupt and send the corresponding touch event signal to the kernel 730. The AP 723 may operate as a processing unit. The AP 723 may control and perform various operations in the electronic device 700. When the AP 723 is realized as a system on chip (SoC), it may perform a graphics processing function (graphics processing unit (GPU)) and/or a communication processing function (communication processor (CP)). Various functions of the AP 723 are described in connection with FIG. 2.

The AP 723 may determine whether the position (coordinates) of a touch event belongs to the main area 711 or the sub area 712. The AP 723 may transfer the touch event together with the area information to a touch input manager of the OS input framework 740.

A touch event received through the inter integrated circuit (I2C) driver 731 may be forwarded through the TSP driver 733 to the OS input framework 740 (e.g. Android input framework). The TSP driver 733 or touch input manager of the OS input framework 740 may determine the procedure for processing the received touch event as described in connection with FIG. 4A. The TSP driver 733 or touch input manager may determine whether to store the touch event, to remove the touch event without further processing, or to transfer the touch event to the application 771 or 772 on the basis of the determined procedure. Processing of a received touch event is described later with reference to FIGS. 9A and 9B.

The application 771 may be run on the main area 711, and the application 772 may be run on the sub area 712. The application 771 and the application 772 may be separate applications or may be the same application with multiple functions. For example, in the case of a video player application, a moving image screen may be displayed on the main area 711 (application 771), and a control menu screen (list, previous, next, pause, play, mute, and the like) may be displayed on the sub area 712 (application 772). Here, touch events detected on the individual areas may be filtered before they are transferred to the application 771 or 772 as described before, preventing malfunction due to a touch event generated by an unintended user action.

Figure 8:
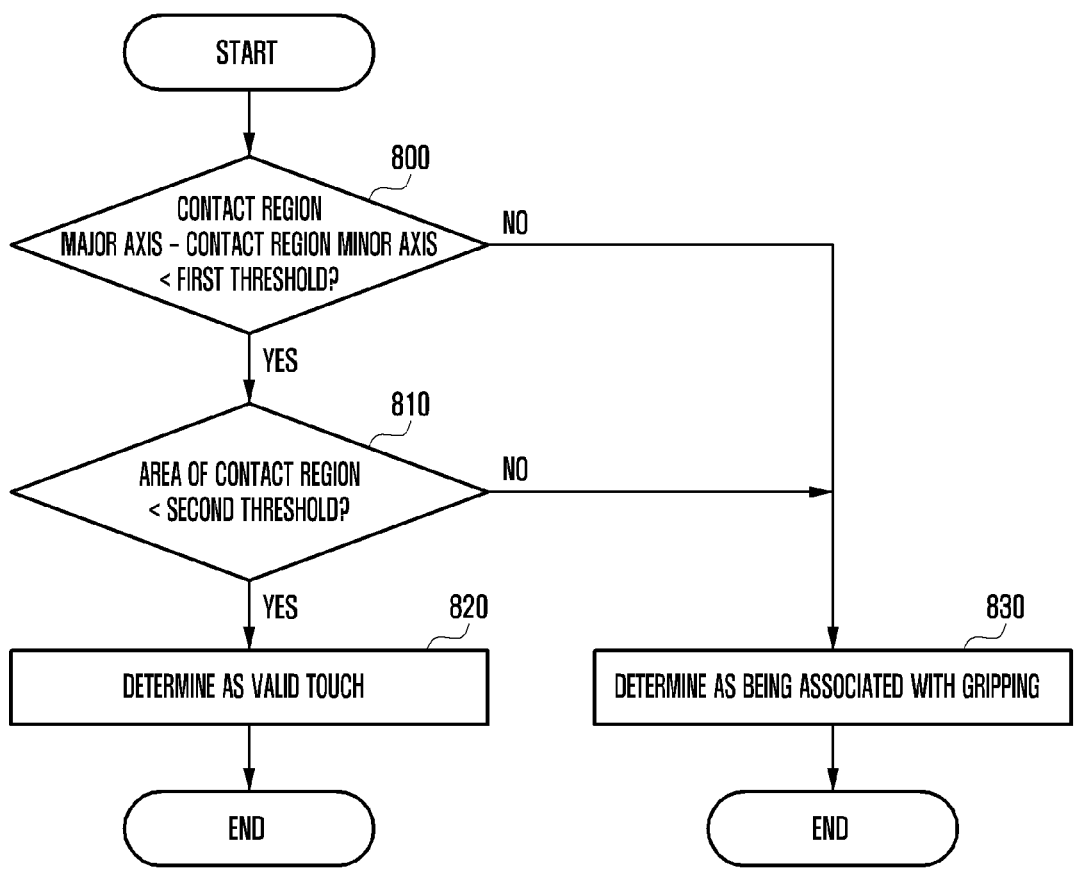
FIG. 8 is a flowchart of a procedure for determining whether a touch event is a valid touch input or is caused by gripping, according to an embodiment of the present disclosure.

FIG. 8 is a flowchart of a procedure for determining whether a touch event is a valid touch input or is caused by gripping, according to an embodiment of the present disclosure.

In an embodiment of the present disclosure, the electronic device (e.g. touch input manager 405) may determine whether a touch event is a valid touch or is associated with gripping on the basis of the contact region of the touch event. Specifically, at Step 800, the electronic device checks whether the difference between the major axis and the minor axis of the contact region is less than a first threshold (in units of micrometers, millimeters, centimeters, or inches). When the contact region is considered as having an elliptical shape, there are two perpendicular axes about which the contact region is symmetric. Here, the larger of these two axes is called the major axis, and the smaller of these two axes is called the minor axis.

When the difference between the major axis and the minor axis of the contact region is greater than or equal to the first threshold, this means that the contact region is close to an ellipse and the corresponding touch event may be considered as being caused by gripping without a specific intention. Hence, if the difference between the major axis and the minor axis of the contact region is greater than or equal to the first threshold, at Step 830, the electronic device determines that the touch event is associated with gripping. If the difference between the major axis and the minor axis of the contact region is less than the first threshold, at Step 810, the electronic device checks whether the area (size) of the contact region is less than a second threshold (in units of square micrometers, square millimeters, or square centimeters). If the area of the contact region is greater than or equal to the second threshold, at Step 830, the electronic device determines that the touch event is associated with gripping. If the area of the contact region is less than the second threshold, at Step 820, the electronic device determines that the touch event is a valid touch. Two or more touch events determined as being a valid touch may constitute a gesture event.

FIGS. 9A to 9D are flowcharts of a method for processing touch events, according to an embodiment of the present disclosure.

Figure 9A:
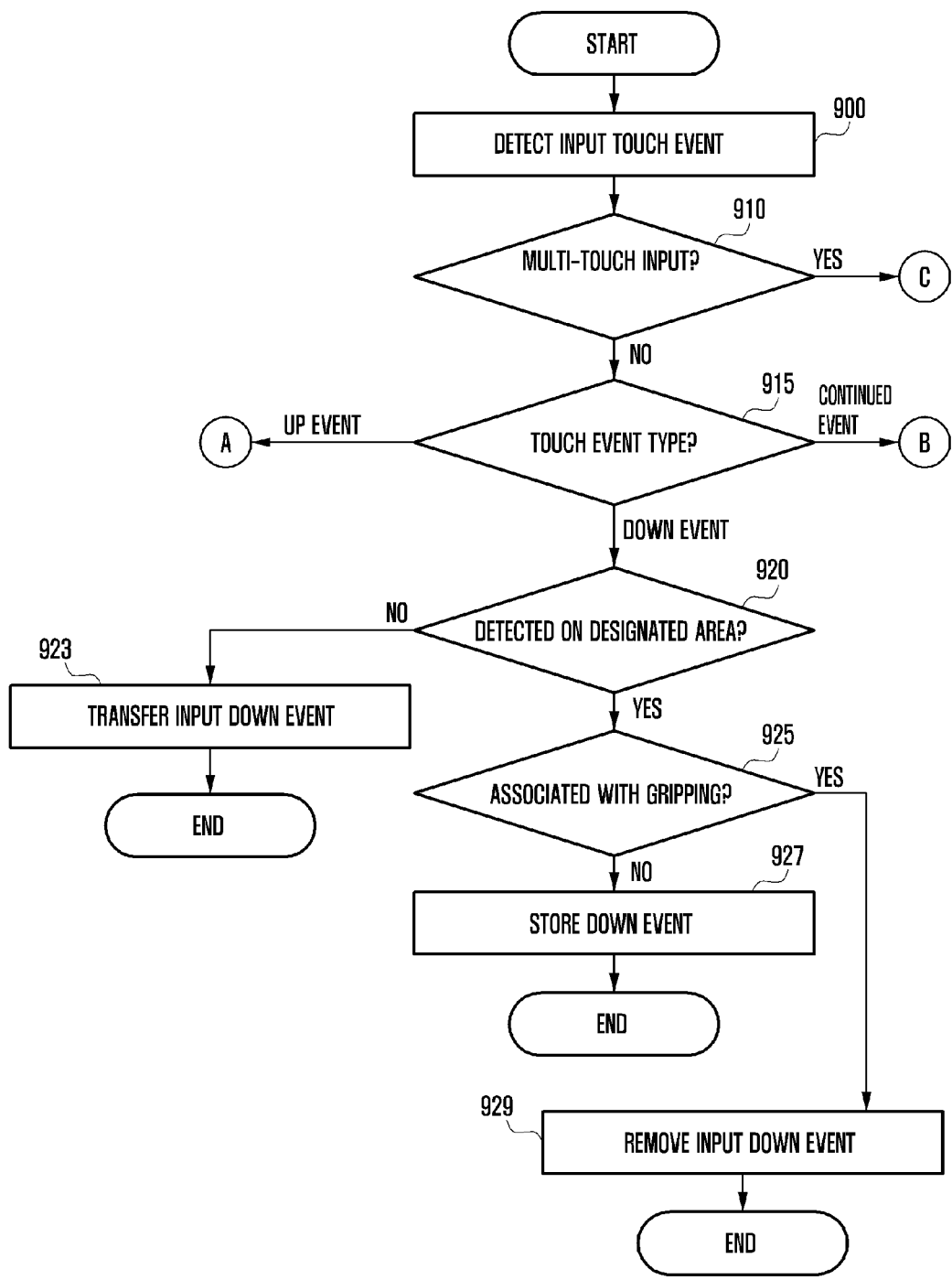

Referring to FIG. 9A, at Step 900, the electronic device (e.g. touch IC 401) detects a touch event occurring on the touch panel of the display. At Step 910, the electronic device (e.g. touch input manager 405) checks whether multi-touch input is detected. Multi-touch input may occur when two or more contact points are formed by pressing the touch panel with input means such as a finger and touch pen. If multi-touch input is detected, the procedure proceeds to Step 970 (FIG. 9D). If single-touch input is detected, at Step 915, the electronic device identifies the type of the touch event.

If the touch event is an up event, the procedure proceeds to Step 940 in FIG. 9B. If the touch event is a continued event, the procedure proceeds to Step 950 in FIG. 9C. If the touch event is a down event, at Step 920, the electronic device determines whether the touch event has occurred on a designated area. Here, the designated area may indicate a display area on which unintended touch input is likely to occur. For example, the designated area may correspond to the areas 412, 422, 432 or 442 in FIG. 4A or the areas 452 or 454 in FIG. 4B. The designated area may also correspond to the areas 510 or 520 in FIG. 5. If the touch event has occurred on an area other than the designated area, at Step 923, the electronic device (e.g. touch input manager 405) transfers the input down event to the corresponding application (e.g. application 407). If the touch event has occurred on the designated area, at Step 925, the electronic device determines whether the input down event is associated with gripping. The electronic device may determine whether a touch event is associated with gripping or is a valid touch by using the scheme described in connection with FIG. 8.

Upon determining that the input down event is associated with gripping, at Step 925, the electronic device removes the input down event. Upon determining that the input down event is a valid touch, at Step 927, the electronic device temporarily stores the input down event.

Referring to FIG. 9B, if the input touch event is an up event in Step 915, at Step 940, the electronic device checks for the presence of a stored down event. An up event may occur when the user releases the input means such as a finger or touch pen from the touch panel after generating a down event. If a stored down event is not present, at Step 946, the electronic device transfers the input up event to the corresponding application. Absence of a stored down event may indicate that the down event having occurred before the current up event has already been transferred to the application.

If a stored down event is present, at Step 945, the electronic device checks whether the difference between the occurrence times of the up event and the stored down event is less than a third threshold (in units of microseconds, milliseconds, or seconds). Here, the occurrence time of a touch event may indicate the actual time at which the touch event has occurred. When the difference between the occurrence times of the up event and the stored down event is small, this may mean that the user has generated touch input intentionally. Hence, if the difference between the occurrence times of the up event and the stored down event is less than the third threshold, at Step 947, the electronic device transfers the stored down event and the input up event to the corresponding application. When the difference between the occurrence times of the up event and the stored down event is large, this may mean that the user has maintained a touch hold for a long time on the designated area (gripping). Hence, if the difference between the occurrence times of the up event and the stored down event is greater than the third threshold, at Step 949, the electronic device removes the stored down event and the input up event.

Figure 9C:
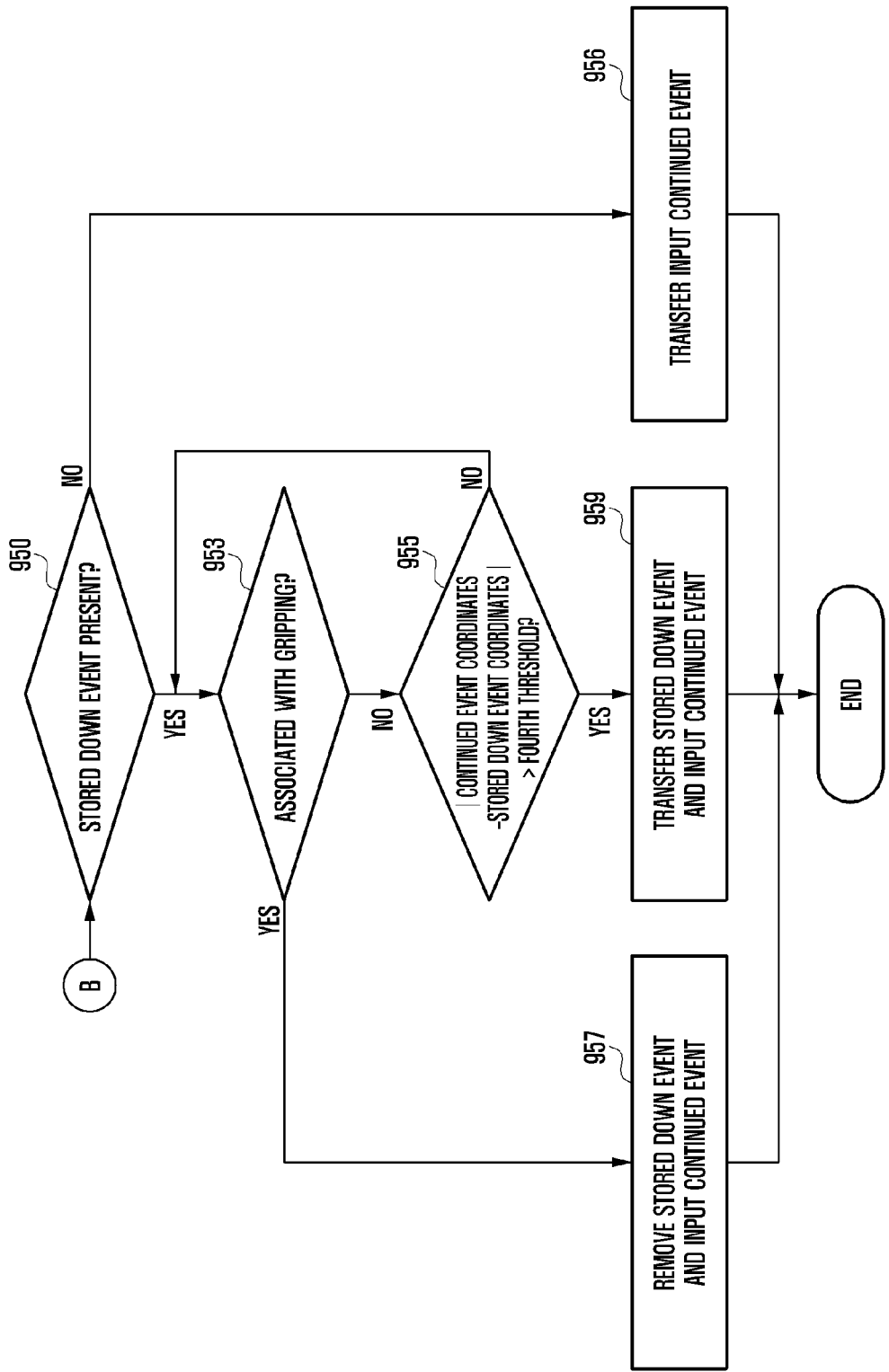
Figure 9D:
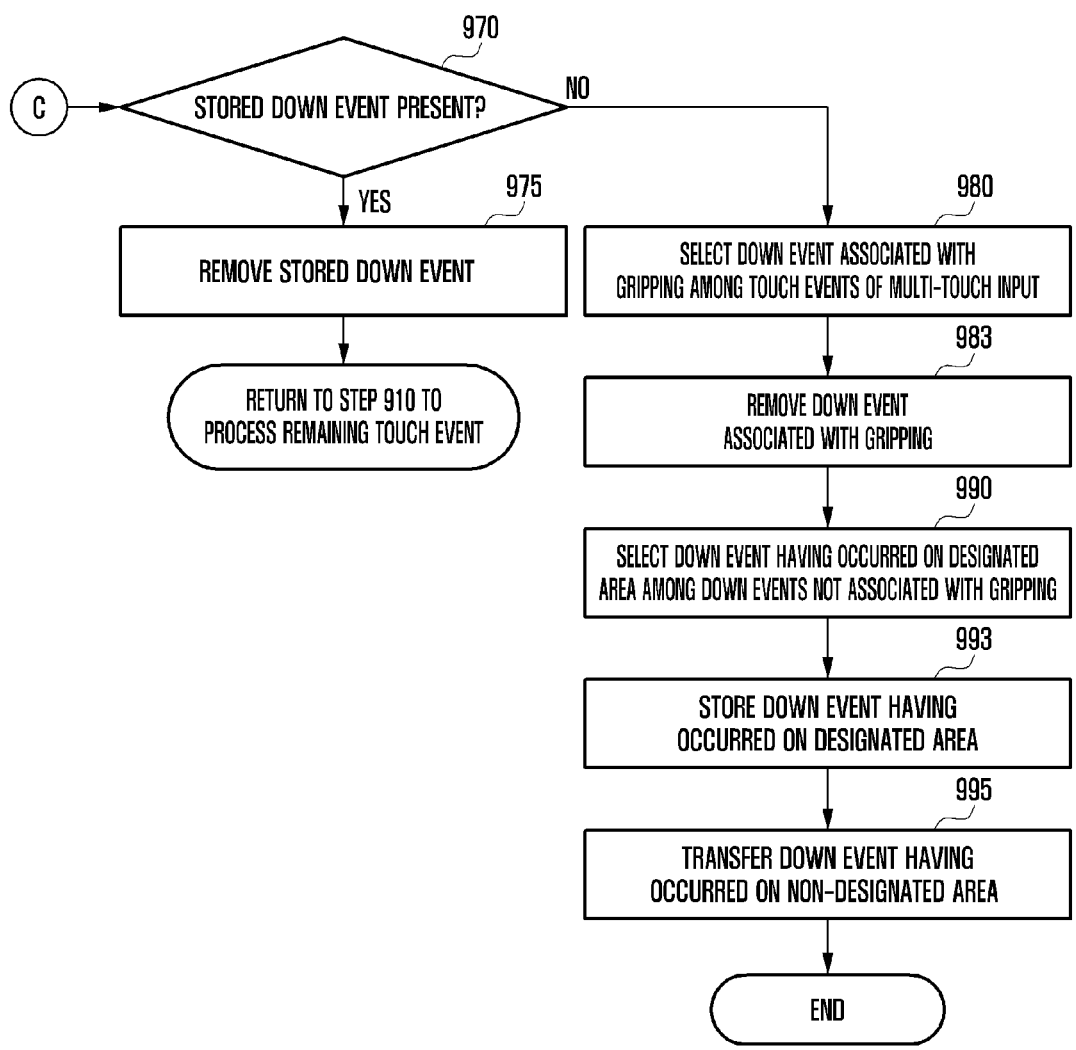

Referring to FIG. 9C, if the touch event is a continued event in Step 915, at Step 950, the electronic device checks presence of a stored down event. A continued event may occur when the user moves the input means on the touch panel without releasing the input means after generating a down event. If a stored down event is not present, at Step 956, the electronic device transfers the input continued event to the corresponding application. Absence of a down event stored before occurrence of the current continued event may indicate that the down event having occurred on an area other than the designated area has already been transferred to the application.

If a down event stored before occurrence of the continued event is present, at Step 953, the electronic device determines whether the continued event is associated with gripping. The electronic device may determine whether a continued touch event is associated with gripping by using the scheme described in connection with FIG. 8. Upon determining that the continued event is associated with gripping, at Step 957, the electronic device removes the stored down event and the input continued event. Upon determining that the continued event is not associated with gripping, at Step 955, the electronic device checks whether the difference between the coordinates of the continued event and the coordinates of the stored down event is greater than a fourth threshold (in units of micrometers, millimeters, centimeters, or inches). Here, the difference between the coordinates of the continued event and the coordinates of the stored down event may indicate the distance of movement from the position of the down event without touch release. If the difference between the coordinates of the continued event and the coordinates of the stored down event is greater than the fourth threshold, at Step 959, the electronic device transfers the stored down event and the input continued event.

If the difference between the coordinates of the continued event and the coordinates of the stored down event is less than or equal to the fourth threshold, the procedure returns to Step 953 at which the electronic device determines whether the continued event is associated with gripping. That is, when a continued touch event is detected, the electronic device may repeatedly check whether the continued event is associated with gripping until the movement distance becomes greater than the fourth threshold. Thereby, only a continued event determined as a valid touch may be transferred to the corresponding application.

Referring to FIG. 9D, if a multi-touch input is detected in Step 915, at Step 970, the electronic device checks for the presence of a stored down event. Presence of a stored down event may indicate that one input touch event is stored at Step 927 as a down event not associated with gripping. If a stored down event is not present, at Step 980, the electronic device selects a down event associated with gripping among touch events constituting multi-touch input. At Step 983, the electronic device removes the selected down event associated with gripping. At Step 990, the electronic device selects a down event having occurred on the designated area from down events not associated with gripping. Here, the designated area may indicate a display area on which unintended touch input is likely to occur (the same as used at Step 920).

Thereafter, at Step 993, the electronic device stores the down event having occurred on the designated area. At Step 995, the electronic device transfers the down event having occurred on an area other than the designated area. The electronic device may differently handle a valid down event and a down event having occurred on the designated area selected from among touch events constituting multi-touch input, executing a function in conformance with the user's intention.

If a stored down event is present, at Step 975, the electronic device removes the stored down event. Thereafter, the procedure returns to Step 910 for processing the remaining touch events constituting multi-touch input. The electronic device may extract valid touch events only from input touch events and provide the same to the corresponding application by performing the scheme described in FIGS. 9A to 9D. Next, a description is given of various applications of the above scheme.

Figure 10A:
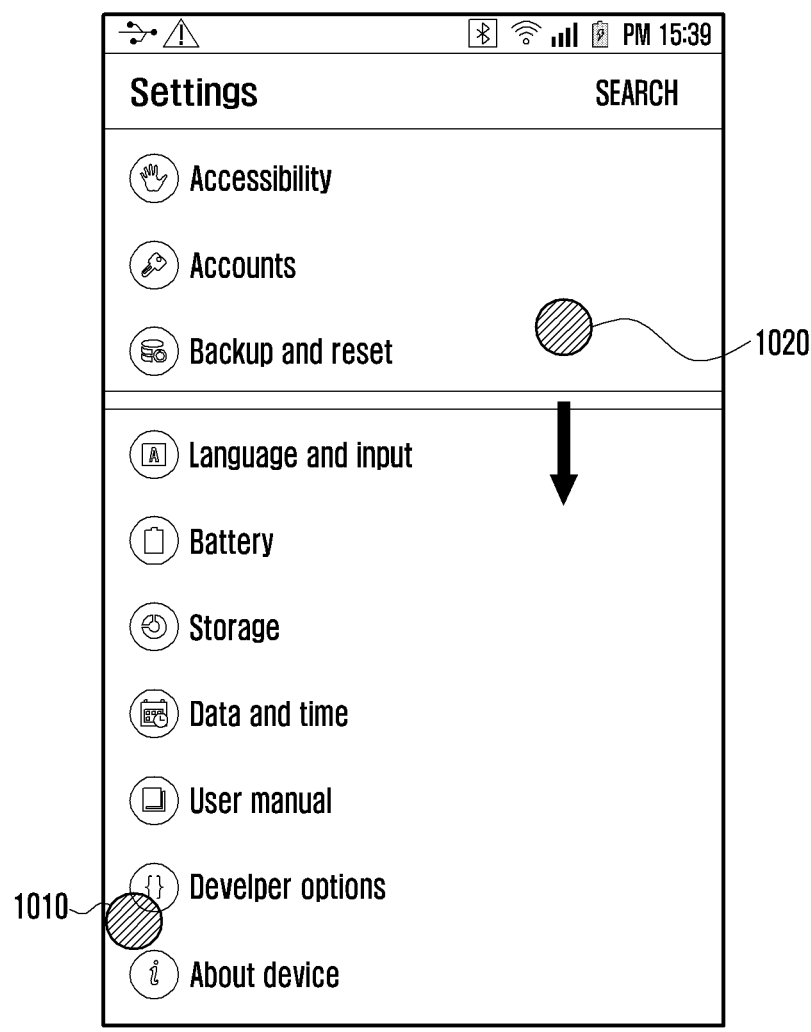
FIGS. 10A and 10B are screen representations illustrating touch event processing, according to an embodiment of the present disclosure.
Figure 10B:
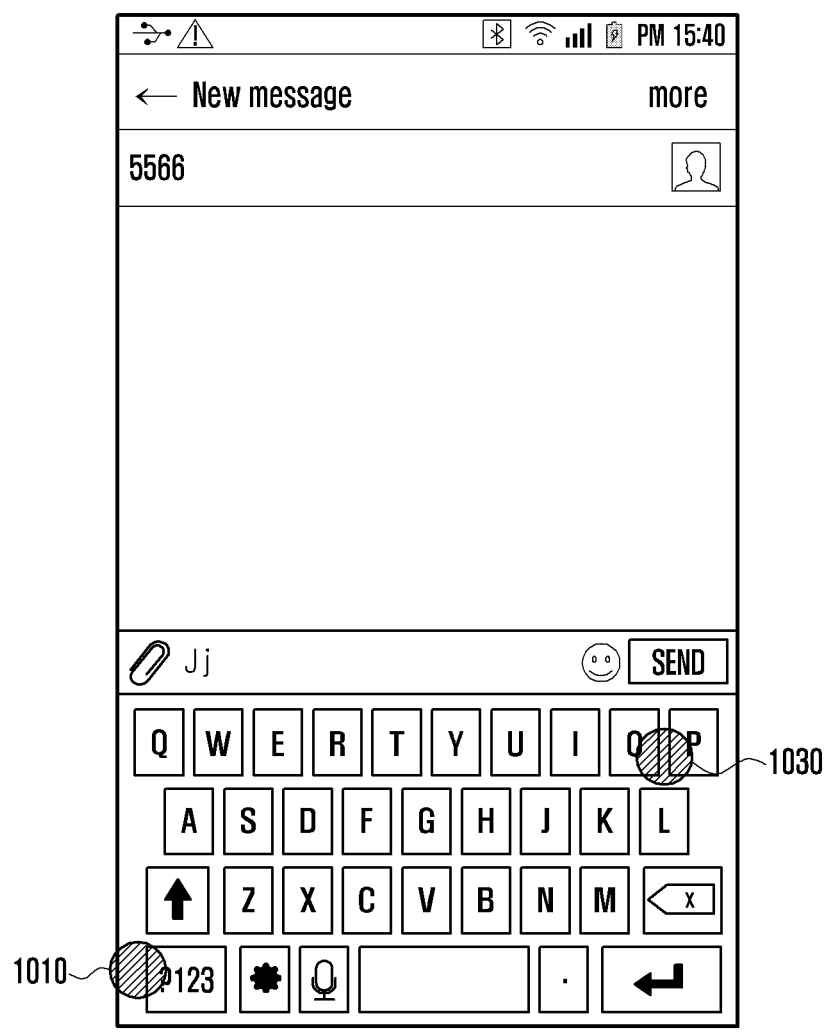

FIGS. 10A and 10B are screen representations illustrating touch event processing, according to an embodiment of the present disclosure.

As described in connection with FIG. 4B, it is assumed that the first area indicates a display area that is used to execute an application or is used by the user to make a touch gesture intentionally, and the second area indicates a display area on which unintended touch input is likely to occur. It is assumed that touch event 1020 in FIG. 10A and touch event 1030 in FIG. 10B are a touch event occurring on the first area, and touch event 1010 is a touch event occurring on the second area. It is also assumed that touch event 1010, touch event 1020, and touch event 1030 are a valid touch (not associated with gripping).

FIG. 10A depicts a situation where detection of touch event 1010 is followed by detection of touch event 1020. In this case, touch event 1010 detected on the second area is temporarily stored, touch event 1020 is detected on the first area, touch event 1010 is removed, and only touch event 1020 is transferred to the corresponding application. This is described in detail below according to the touch handling scheme of FIG. 9.

When touch event 1010 is detected, touch event 1010 may be determined as single-touch input at Step 910, it may be determined as a down event at Step 915, it may be determined as having occurred on the second area (designated area) at Step 920, it may be determined as a valid touch at Step 925, and it may be stored at Step 927. Thereafter, when touch event 1020 is detected, touch event 1020 may be determined as multi-touch input together with touch event 1010 at Step 910, it may be determined that a stored down event (touch event 1010) is present at Step 970, and the stored down event (touch event 1010) may be removed at Step 975, preventing malfunction due to unintended user action. Thereafter, the procedure may return to Step 910 at which touch event 1020 is processed further.

Touch event 1020 may be determined as single-touch input at Step 910, it may be determined as a down event at Step 915, it may be determined as having occurred on the first area (not designated area) at Step 920, and it may be transferred to the corresponding application at Step 923. When touch event 1010 is detected on the second area, determination of whether to transfer it to the corresponding application or to delete it may be delayed for a while and carried out in consideration of the next touch event 1020.

FIG. 10B depicts a situation where detection of touch event 1030 is followed by detection of touch event 1010. In this case, touch event 1030 detected on the first area may be transferred to the corresponding application, and touch event 1010 detected on the second area may be temporarily stored without immediate transmission. Thereafter, when the user generates a touch event on the first area as shown in FIG. 10A, stored touch event 1010 may be removed. As a result, a touch event considered as not matching the user's intention may be removed, and only a touch event considered as matching the user's intention may be selected and transferred to the corresponding application. Hence, it is possible to provide a function in conformance with the user's intention.

Figure 11:
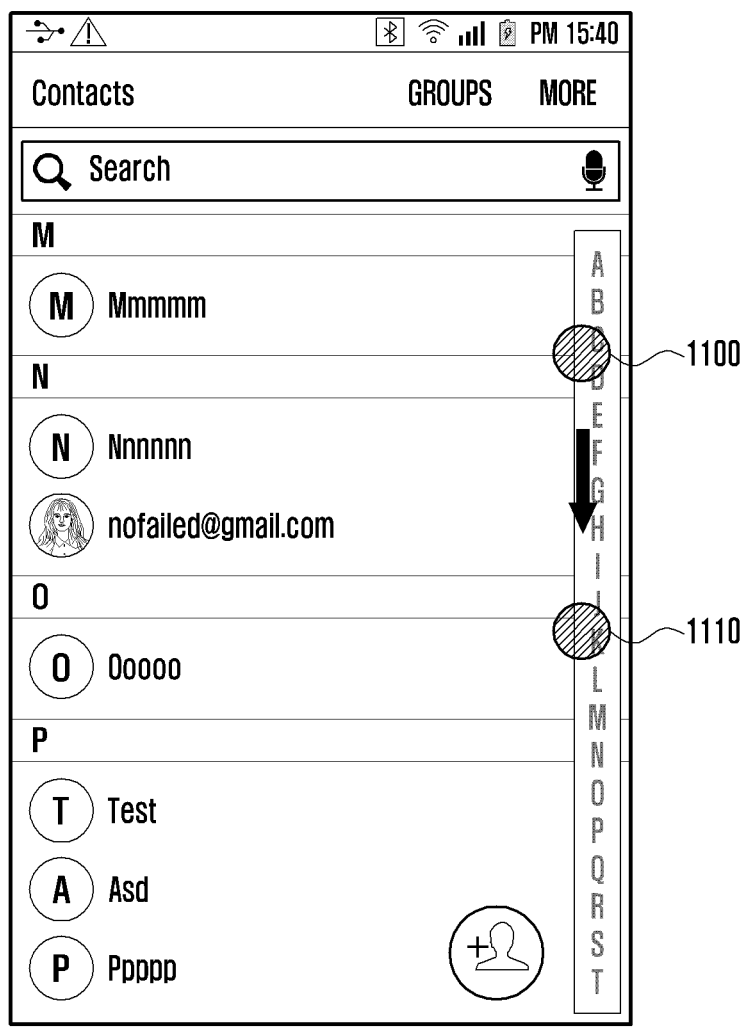
FIG. 11 is a screen representation illustrating touch event processing, according to an embodiment of the present disclosure.

FIG. 11 is a screen representation illustrating touch event processing, according to an embodiment of the present disclosure.

Referring to FIG. 11, touch input control is described under the assumption that the first area indicates a display area that is used to execute an application or is used by the user to make a touch gesture intentionally, and the second area indicates a display area on which unintended touch input is likely to occur. It is also assumed that the display areas include a flat area and a curved area. In FIG. 11, it is assumed that touch events 1100 and 1110 are both detected on the second area or curved area. It is also assumed that touch events 1100 and 1110 are determined as a valid touch (not associated with gripping). To prevent touch malfunction, a dead zone on which touch input is not allowed may be configured in a region close to the bezel. Here, it is also assumed that touch events 1100 and 1110 are generated on such a dead zone. In such a case, when the user generates a touch event at a position close to the bezel, it may be unable to provide a function in conformance with the user's intention. However, the electronic device according to an embodiment of the present disclosure may provide a function corresponding to touch input like touch events 1100 and 1110 without configuring a dead zone. This is described in detail below according to the touch processing scheme of FIG. 9.

When touch event 1100 is detected, touch event 1100 may be determined as single-touch input at Step 910, it may be determined as a down event at Step 915, it may be determined as having occurred on the second area (designated area) at Step 920, it may be determined as a valid touch at Step 925, and it may be stored at Step 927. Thereafter, when touch event 1110 is detected as an extended event for touch event 1100, touch event 1110 may be determined as single-touch input at Step 910, touch event 1110 may be determined as a continued event at Step 915, it may be determined that a stored down event (touch event 1100) is present at Step 970, touch event 1110 may be determined as a valid touch at Step 953, and if the movement distance between touch event 1100 and touch event 1110 is greater than the threshold at Step 955, both touch event 1100 and touch event 1110 may be transferred to the corresponding application at Step 959.

If the movement distance between touch event 1100 and touch event 1110 is less than or equal to the threshold at Step 955, both touch event 1100 and touch event 1110 may be regarded as unintended touch inputs and may be removed at Step 957. As a result, it is possible to select a touch event considered as a valid touch and to transfer the same to the corresponding application. Hence, the electronic device may provide a touch-related function in consideration of the user's intention without configuring a dead zone disabling touch input itself.

FIGS. 12A to 12F illustrate touch event processing in the electronic device, according to an embodiment of the present disclosure.

In FIGS. 12A to 12F, the electronic device 1200 may have a flat display at one side, a curved display at one side, or curved displays at two sides. For the electronic device 1200, touch input processing is described under the assumption that the area 1209 is a display area that is used to execute an application or is used by the user to make a touch gesture intentionally, and the area 1205 or 1207 is a display area on which unintended touch input is likely to occur.

Figure 12A:
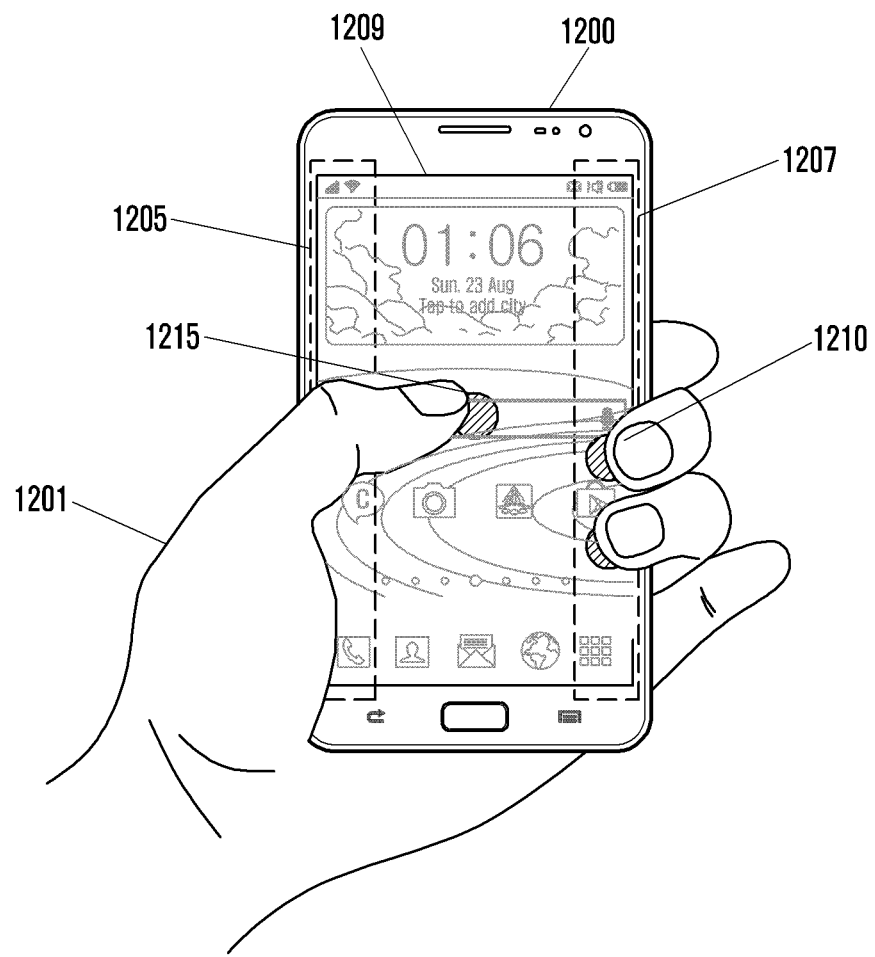
FIGS. 12A to 12F illustrate touch event processing, in an electronic device according to an embodiment of the present disclosure.

FIG. 12A depicts a situation where, while the user grips the electronic device 1200 with the left hand 1201, a down event 1210 is generated on the area 1207 by a finger contacting the touch panel at one side. In this case, down event 1210 detected on the area 1207 may be temporarily stored. Thereafter, when down event 1215 is detected on the area 1209, stored down event 1210 may be removed and only down event 1215 may be transferred to the corresponding application. This touch event processing is the same as described in FIG. 10A.

In addition, while the user grips the electronic device 1200 with the left hand 1201, a new down event may be repeatedly generated on the area 1207. In this case, down events generated on the area 1207 may be temporarily stored and then removed in sequence (only the last down event may be actually stored). Thereafter, when down event 1215 is detected on the area 1209, the latest stored down event may be removed, and only down event 1215 may be transferred to the corresponding application as being considered as conforming to the user's intention.

Figure 12B:
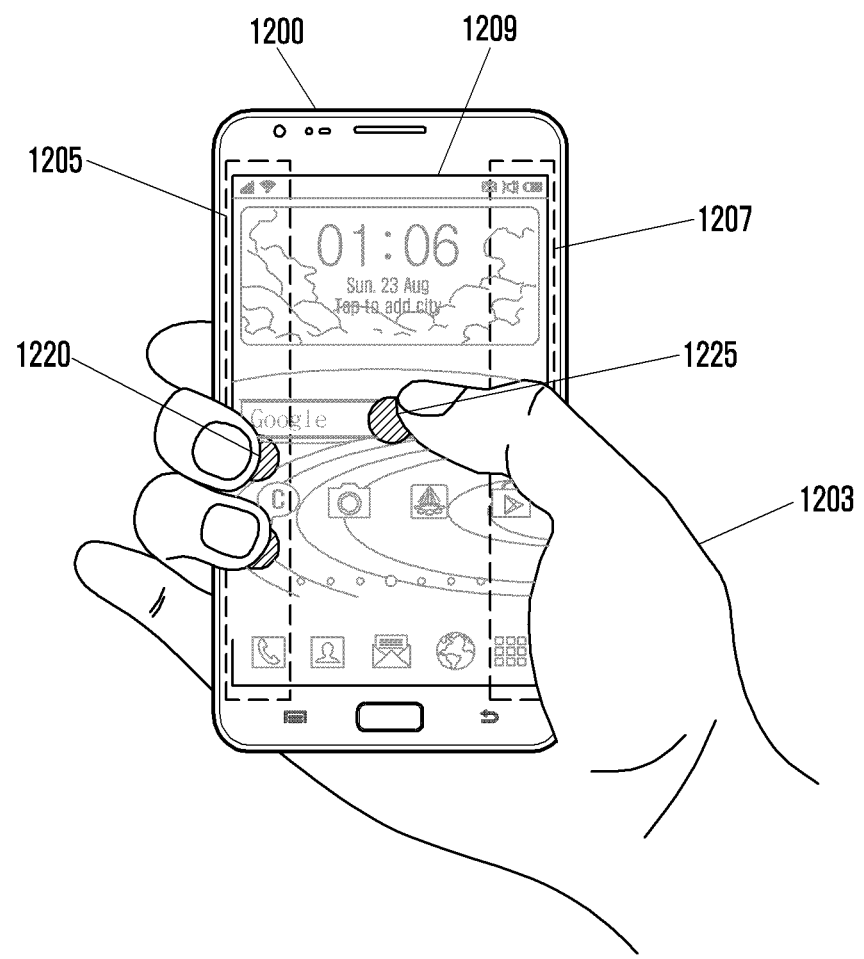

FIG. 12B depicts a situation where, while the user grips the electronic device 1200 with the right hand 1203, a down event 1220 is generated on the area 1205 by a finger contacting the touch panel at one side. In this case, similarly to the case of FIG. 12A, touch event 1220 detected on the area 1205 may be temporarily stored. Thereafter, when touch event 1225 is detected on the area 1209, stored down event 1220 may be removed, and only touch event 1225 may be transferred to the corresponding application.

Figure 12C:
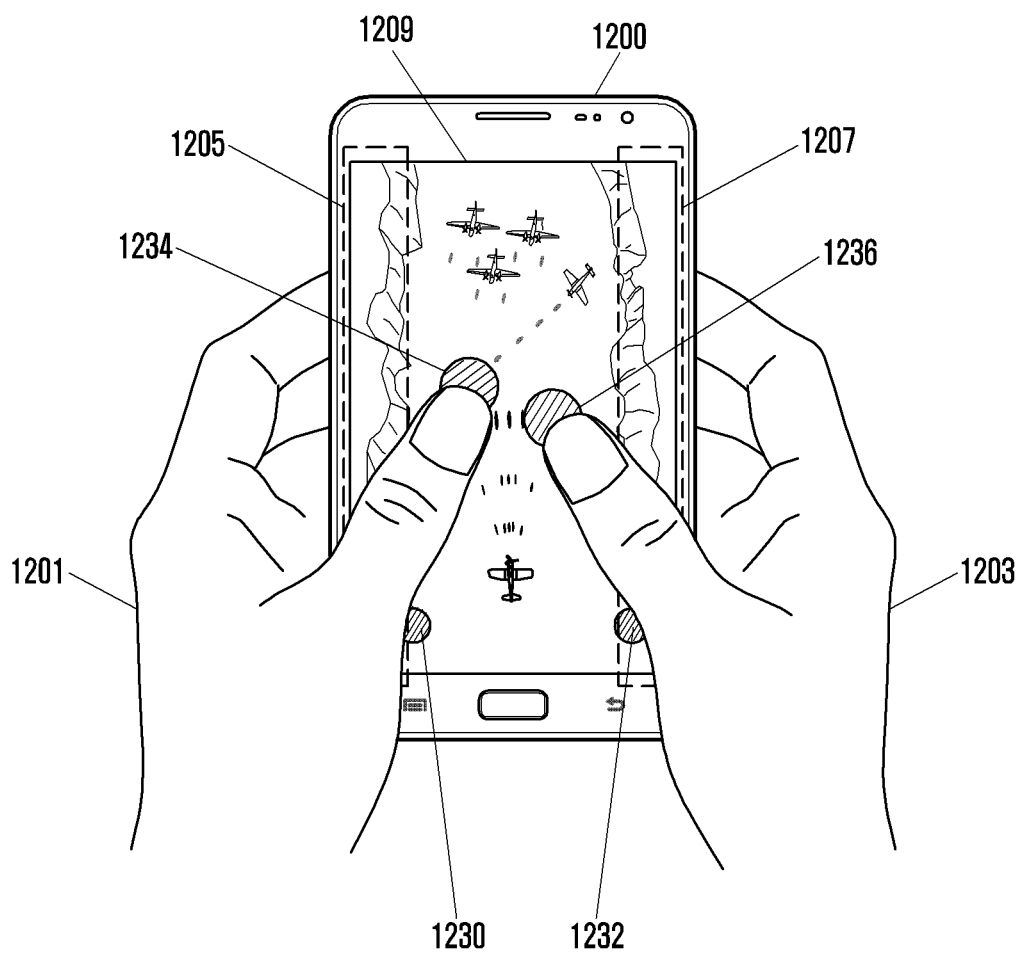

FIG. 12C depicts a situation where, while the user grips the electronic device 1200 with the left and right hands 1201 and 1203 to play a video game, down events 1230 and 1232 are generated on the areas 1205 and 1207 by the thumbs or fingers contacting the touch panel at both sides. In this case, down event 1230 or 1232 generated on the area 1205 or 1207 may be temporarily stored. Thereafter, when touch event 1234 or 1236 is detected on the area 1209, stored down event 1230 or 1232 may be removed, and only touch event 1234 or 1236 may be transferred to the corresponding application as being considered as conforming to the user's intention.

Figure 12D:
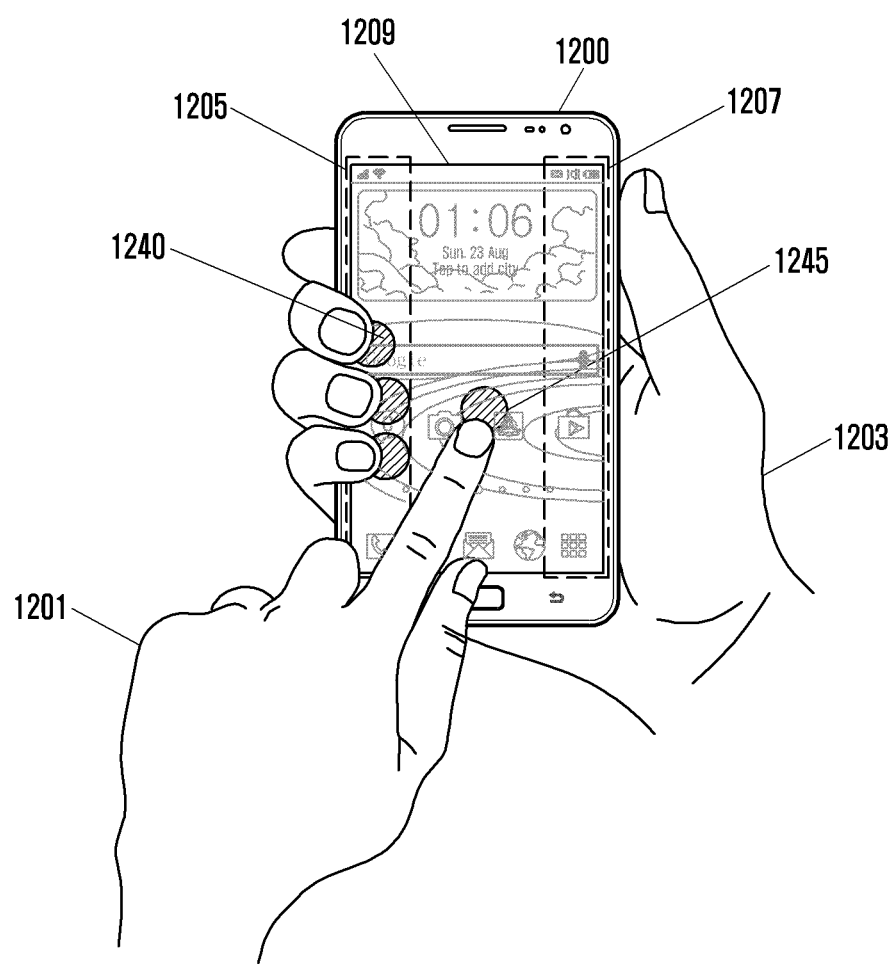

FIG. 12D depicts a situation where, while the user grips the electronic device 1200 with the right hand 1203, a down event 1240 is generated on the area 1205 by a finger contacting the touch panel at one side. In this case, similarly to the case of FIG. 12B, touch event 1240 detected on the area 1205 may be temporarily stored. Thereafter, when touch event 1245 is detected on the area 1209, stored down event 1240 may be removed, and only touch event 1245 may be transferred to the corresponding application as being considered as conforming to the user's intention.

Figure 12E:
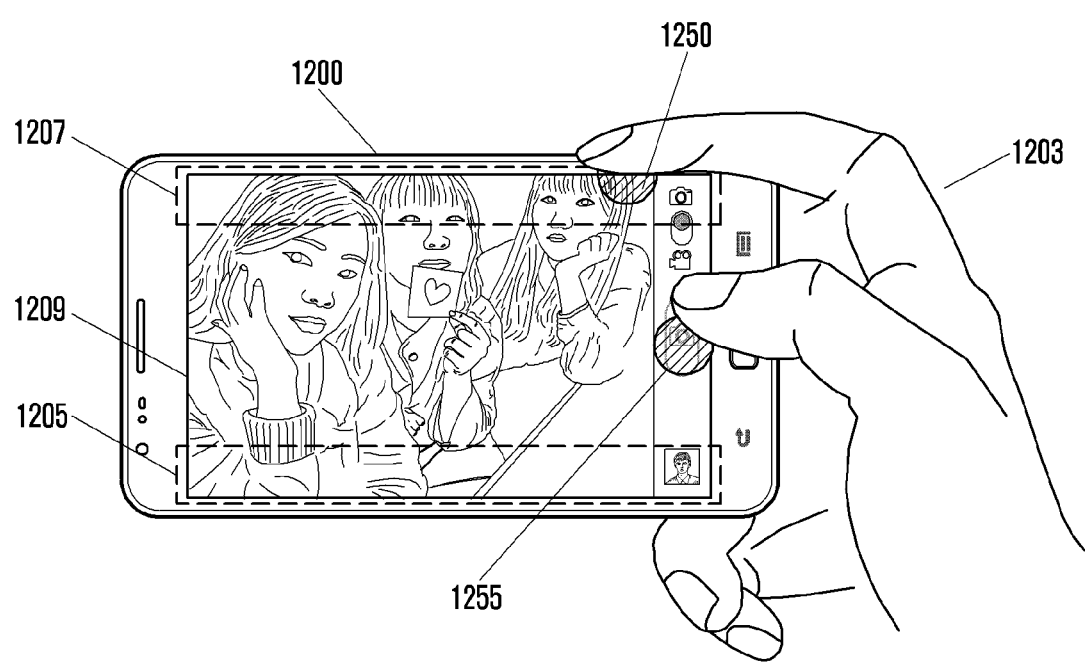

FIG. 12E depicts a situation where, while the user grips the electronic device 1200 with the right hand 1203 to take a photograph in landscape orientation, a down event 1250 is generated on the area 1207 by a finger contacting the touch panel at one side. In this case, similarly to the case of FIG. 12A, touch event 1250 detected on the area 1207 may be temporarily stored. Thereafter, when touch event 1255 is detected on the area 1209, stored down event 1250 may be removed, and only touch event 1255 may be transferred to the corresponding application as being considered as conforming to the user's intention.

Figure 12F:
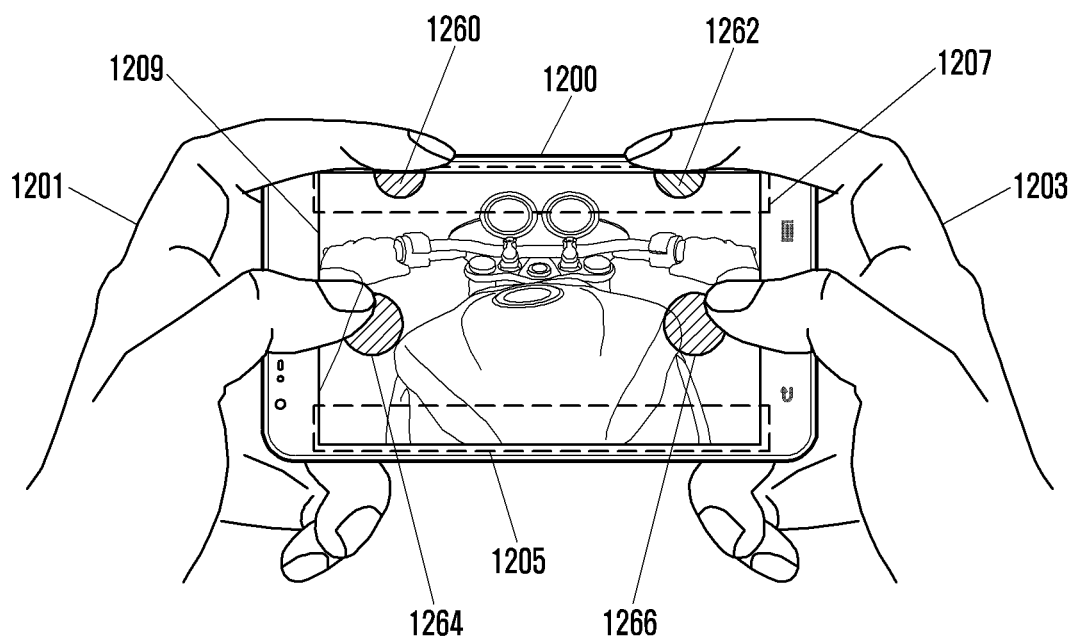

FIG. 12F depicts a situation where, while the user grips the electronic device 1200 with the left and right hands 1201 and 1203 to play a video game in landscape orientation, down events 1260 and 1262 are generated on the area 1207 by the fingers contacting the touch panel at one side. In this case, down event 1260 or 1262 generated on the area 1207 may be temporarily stored. Thereafter, when touch event 1264 or 1266 is detected on the area 1209, stored down event 1260 or 1262 may be removed, and only touch event 1264 or 1266 may be transferred to the corresponding application, providing a function conforming to the user's intention. That is, it is possible to prevent malfunction due to unintended touch input such as touch event 1260 or 1262.

It may be seen from FIGS. 12A to 12F that it is possible to prevent malfunction due to unintended touch input by selecting a touch event conforming to user intention only on the basis of attributes of the touch event.

FIGS. 13A to 13F illustrate touch event processing on a curved display of the electronic device according to an embodiment of the present disclosure.

In FIGS. 13A to 13F, the electronic device 1300 may have a curved display at one side or curved displays at two sides. The display of the electronic device 1300 may include a curved area 1305 or 1307. For the electronic device 1300, touch input processing is described under the assumption that the area 1309 is a display area that is used to execute an application or is used by the user to make a touch gesture intentionally, and the area 1305 or 1307 is a display area on which unintended touch input is likely to occur.

The display of the electronic device 1300 may be functionally divided into the area 1309 and the area 1305 or 1307. The area 1309 may be used for executing applications (e.g. messaging application, schedule application, and Internet application), and the area 1305 or 1307 may be used for displaying icons associated with frequently used applications. The area 1305 or 1307 may also be used for displaying information on stock quotations, weather, or sports according to user settings. When a touch event is detected on the area 1305 or 1307, the electronic device may update the displayed information or execute an application related to the displayed information.

Figure 13A:
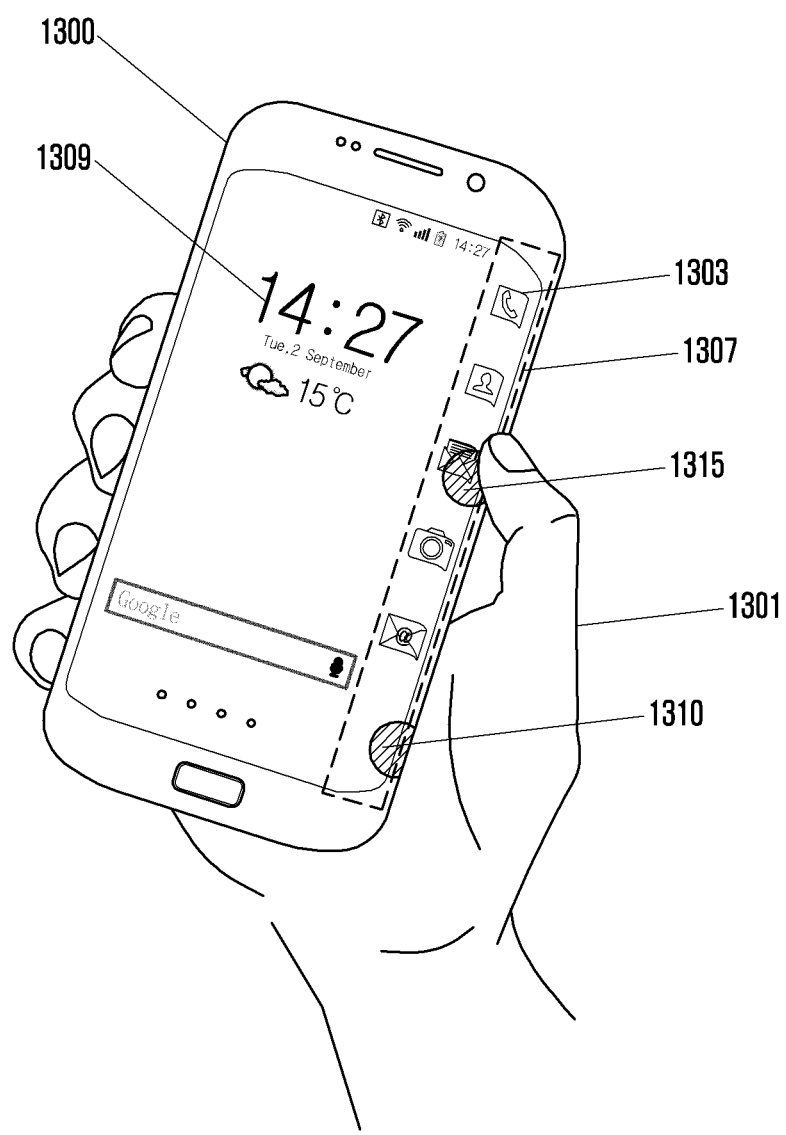
FIGS. 13A to 13F illustrate touch event processing on a curved display of an electronic device, according to an embodiment of the present disclosure.

FIG. 13A depicts a situation where, while the user grips the electronic device 1300 with the right hand 1301, a touch event and up event are generated on the area 1307 by a finger contacting the touch panel at one side to use a menu displayed at position 1303. In this case, down event 1310 detected on the area 1307 may be temporarily stored. When down event 1315 is detected on the area 1307, stored down event 1310 may be removed, and down event 1315 may be temporarily stored. Thereafter, while down event 1315 is still stored, when an up event is generated by releasing the input means (finger) within a preset time, down event 1315 and up event may be transferred to the corresponding application. Hence, the electronic device may provide a function according to the down event 1315 and up event. For example, the electronic device may execute, on the area 1309, an application associated with an item of a menu screen displayed at position 1303. This is described in detail according to the touch processing scheme of FIG. 9.

When down event 1310 is detected on the area 1307, down event 1310 may be temporarily stored. Thereafter, when down event 1315 is detected, down event 1310 may be removed at Step 975. Touch event 1315 may be determined as single-touch input at Step 910, it may be determined as a down event at Step 915, it may be determined as having occurred on the second area (designated area) at Step 920, it may be determined as a valid touch at Step 925, and it may be stored at Step 927. Thereafter, when the user releases the finger from a specific item (selection) of the menu screen at position 1303, an up event is generated on the area 1307. The up event may be determined as single-touch input at Step 910 and Step 915, it may be determined that a stored down event (touch event 1315) is present at Step 940, and, if the difference between the up event time and the stored down event time is less than the third threshold at Step 945, stored down event 1315 and the up event may be transferred to the corresponding application at Step 950.

If the difference between the occurrence time of down event 1315 and the occurrence time of the up event due to finger release is greater than the third threshold, the electronic device 1300 may consider touch event 1315 as being associated with gripping (not menu selection) and remove both down event 1315 and up event at Step 949. Hence, the electronic device may prevent malfunction due to unintended touch input.

Figure 13B:
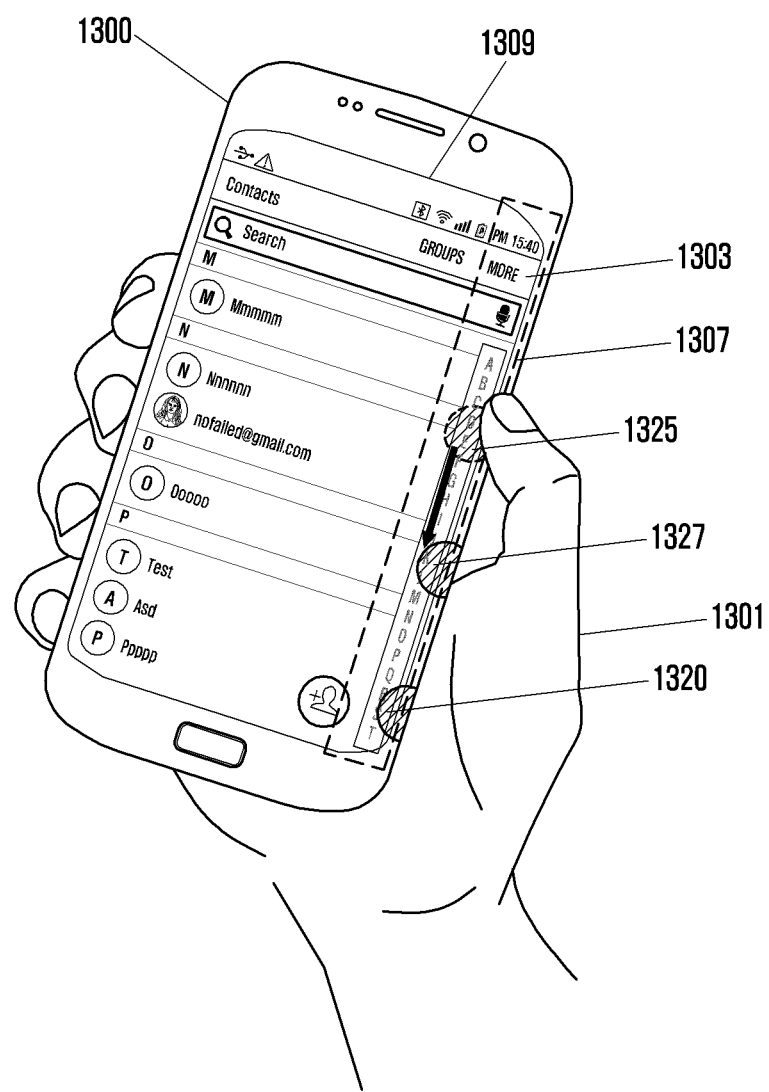

FIG. 13B depicts a situation where, while the user grips the electronic device 1300 with the right hand 1301, down event 1325 and subsequent event 1327 are generated on the area 1307 by a finger contacting the touch panel at one side to activate a scroll-down function. In this case, similarly to the case of FIG. 13A, down event 1320 may be removed when down event 1325 is generated. Thereafter, continued event 1327 is generated in the vertical direction at a position close to the bezel. As described in connection with FIG. 9, if the distance between down event 1325 and continued event 1327 moved without touch-release is greater than or equal to the fourth threshold, both down event 1325 and continued event 1327 may be transferred to the corresponding application at Step 959. Hence, although touch events are generated in a region close to the bezel, it is possible to activate the scroll function in accordance with the user's intention.

Figure 13C:
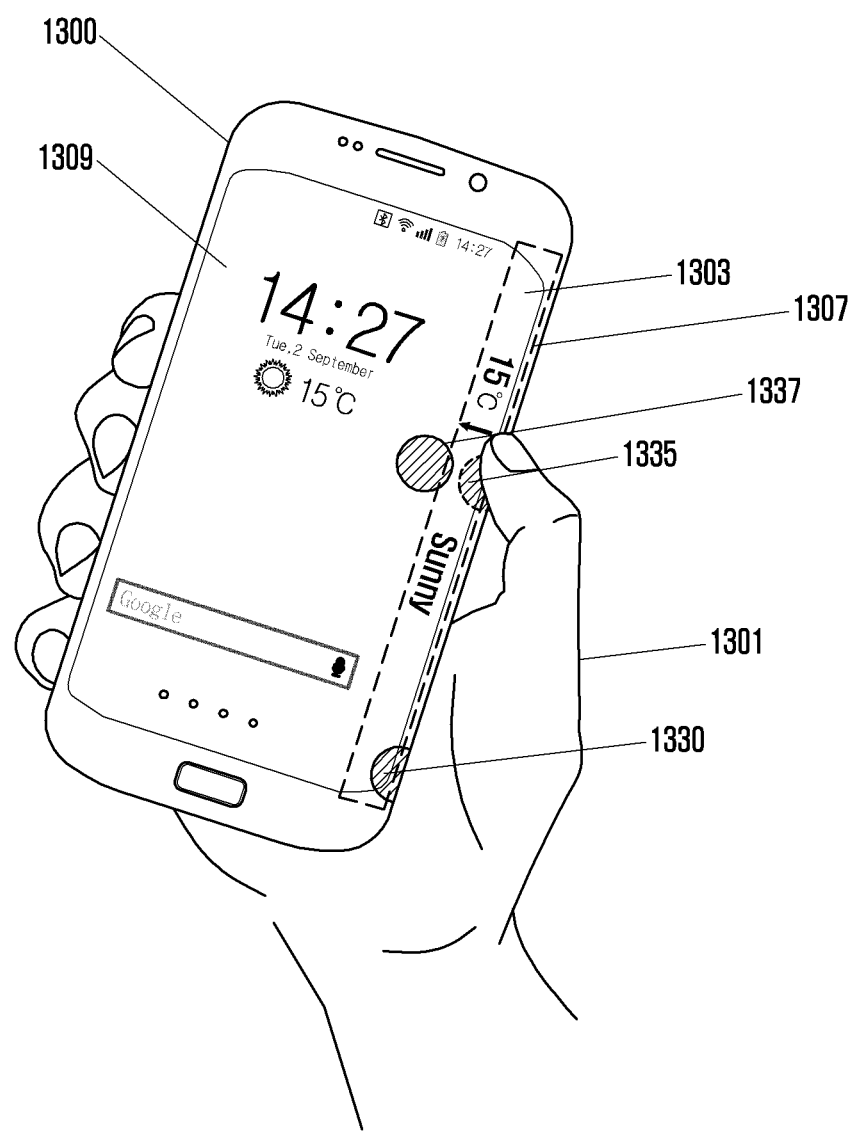

FIG. 13C depicts a situation where, while the user grips the electronic device 1300 with the right hand 1301, down event 1335 and subsequent event 1337 are generated on the area 1307 by a finger contacting the touch panel at one side to switch a screen displayed at position 1303. In this case, similarly to the case of FIG. 13A, down event 1330 may be removed when down event 1335 is generated. Thereafter, continued event 1337 is generated in the horizontal direction. As described in connection with FIG. 9, if the distance between down event 1335 and continued event 1337 moved without touch-release is greater than or equal to the fourth threshold, both down event 1335 and continued event 1337 may be transferred to the corresponding application at Step 959. Hence, it is possible to switch the screen displayed at position 1303 in accordance with the user's intention. For example, in response to down event 1335 and subsequent continued event 1337 in the horizontal direction, weather information displayed at position 1303 may be replaced with stock quotation or sports information.

Figure 13D:
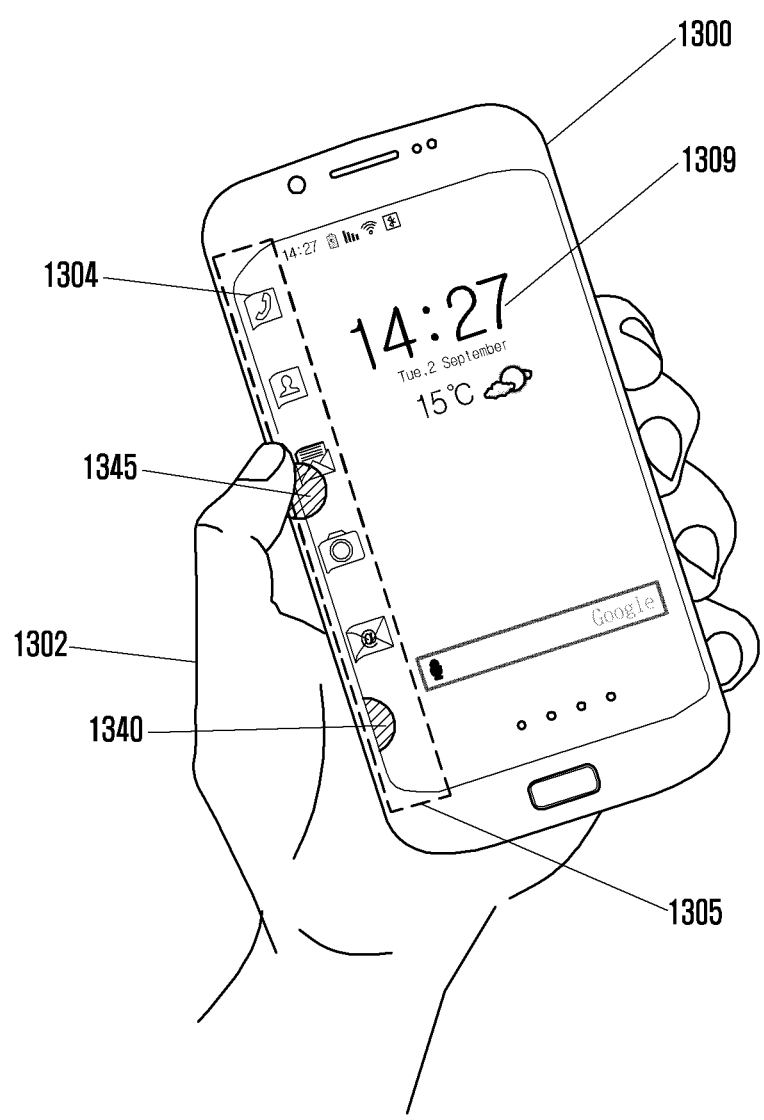

FIG. 13D depicts a situation where, while the user grips the electronic device 1300 with the left hand 1302, down and up events are generated on the area 1305 by a finger contacting the touch panel at one side to activate a frequently used function of a menu screen displayed at position 1304. In this case, similarly to the case of FIG. 13A, down event 1340 may be temporarily stored. When down event 1345 is generated, stored down event 1340 may be removed, and down event 1345 may be temporarily stored. Thereafter, when an up event is generated within a threshold time by releasing the finger, down event 1345 and up event may be transferred to the corresponding application. Hence, the electronic device may provide a function indicated by down event 1345.

Figure 13E:
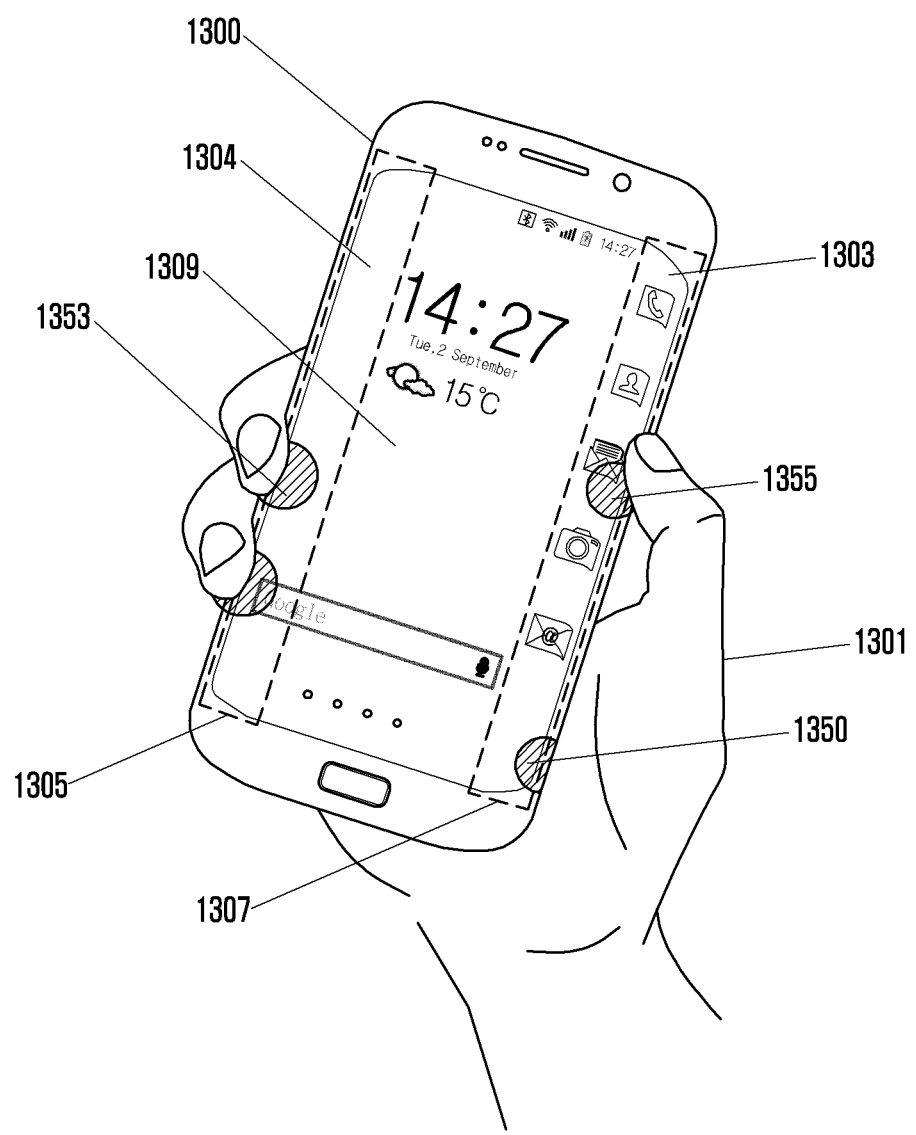

FIG. 13E depicts a situation where, while the user grips the electronic device 1300 with the right hand 1301, a touch event is generated by a finger contacting the touch panel at one side to use a menu displayed at position 1303 and a touch event 1353 is generated by fingers contacting the touch panel at position 1304. In this case, down event 1350 detected on the area 1307 may be temporarily stored. When down event 1355 is detected on the area 1307, stored down event 1350 may be removed, and down event 1355 may be temporarily stored. Thereafter, while down event 1355 is still stored, when an up event is generated by releasing the input means (finger) within a preset time, down event 1355 and up event may be transferred to the corresponding application. Hence, the electronic device may provide a function according to the down event 1355 and up event. For example, the electronic device may execute, on the area 1309, an application associated with an item of a menu screen displayed at position 1303.

If the difference between the occurrence time of touch event 1353 and the occurrence time of the up event due to finger release is greater than the third threshold, the electronic device 1300 may consider touch event 1353 as being associated with gripping (not menu selection) and remove both touch event 1353 and up event at Step 949. Hence, the electronic device may prevent malfunction due to unintended touch input.

Figure 13F:
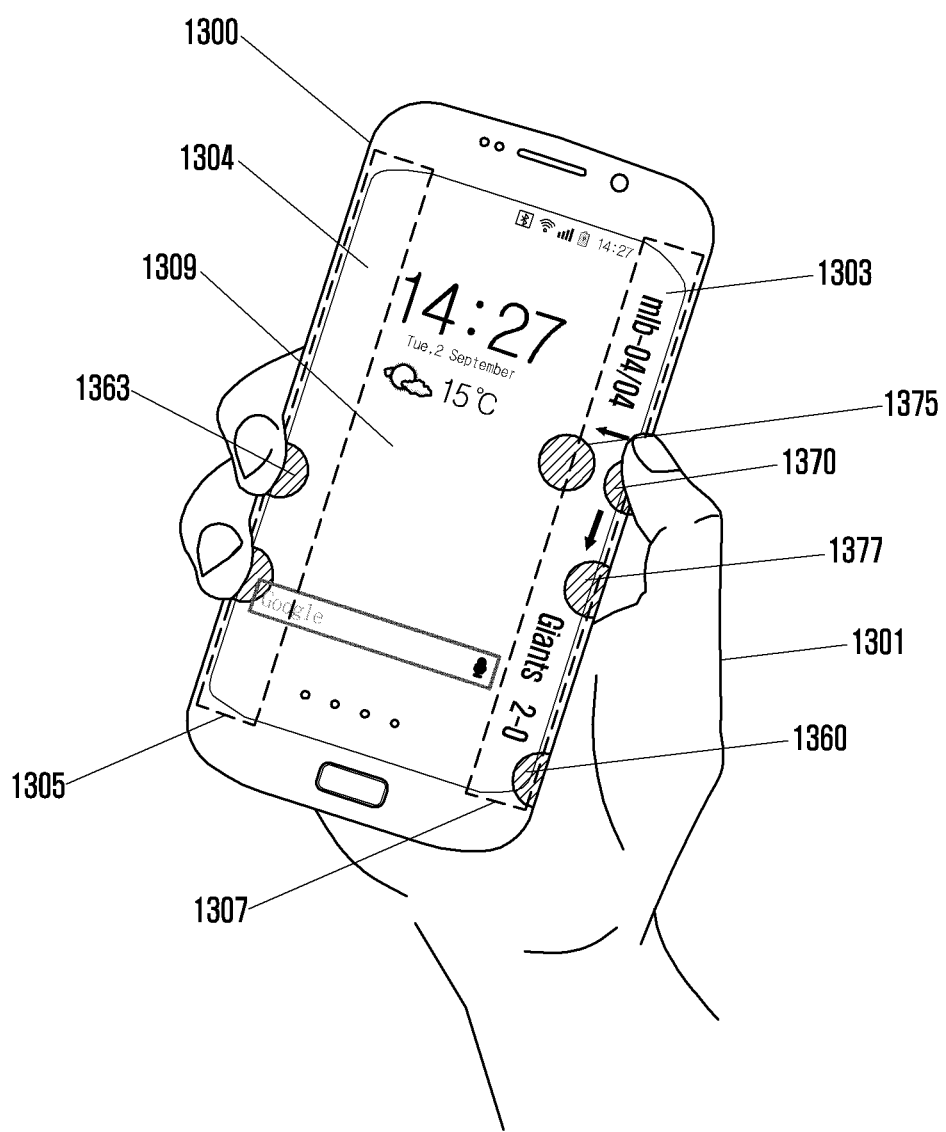

FIG. 13F depicts a situation where, while the user grips the electronic device 1300 with the right hand 1301, down event 1370 and continued event 1375 are generated by a finger contacting the touch panel at one side to switch a screen displayed at position 1303 and a touch event 1363 is generated by fingers contacting the touch panel at position 1304. In this case, down event 1360 may be removed when down event 1370 is generated. Thereafter, continued event 1375 is generated in the horizontal direction. As described in connection with FIG. 9, if the distance between down event 1370 and continued event 1375 moved without touch-release is greater than or equal to the fourth threshold, both down event 1370 and continued event 1375 may be transferred to the corresponding application at Step 959. Hence, it is possible to switch the screen displayed at position 1303 in accordance with the user's intention. For example, in response to down event 1370 and subsequent continued event 1375 in the horizontal direction, sports information displayed at position 1303 may be replaced with stock quotation or weather information.

FIG. 13F also depicts a situation where, while the user grips the electronic device 1300 with the right hand 1301, down event 1370 and continued event 1377 are generated on the area 1307 by a finger contacting the touch panel at one side to activate a scroll-down function and a touch event 1363 is generated by fingers contacting the touch panel at position 1304. In this case, down event 1360 may be removed when down event 1370 is generated. Thereafter, continued event 1377 is generated in the vertical direction at a position close to the bezel. As described in connection with FIG. 9, if the distance between down event 1370 and continued event 1377 moved without touch-release is greater than or equal to the fourth threshold, both down event 1370 and continued event 1377 may be transferred to the corresponding application at Step 959. Hence, although touch events are generated in a region close to the bezel, it is possible to activate the scroll function in accordance with the user's intention.

If the difference between the occurrence time of touch event 1363 and the occurrence time of the up event due to finger release is greater than the third threshold, the electronic device 1300 may consider touch event 1363 as being associated with gripping (not menu selection) and remove both touch event 1363 and up event at Step 949. Hence, the electronic device may prevent malfunction due to unintended touch input.

It may be seen from FIGS. 13A to 13F that it is possible to prevent malfunction due to unintended touch input by selecting a touch event conforming to the user's intention only on the basis of attributes of the touch event. Hence, the electronic device may block unintended function execution without configuring a dead zone disabling touch input itself in a region close to the bezel.

Figure 14A:
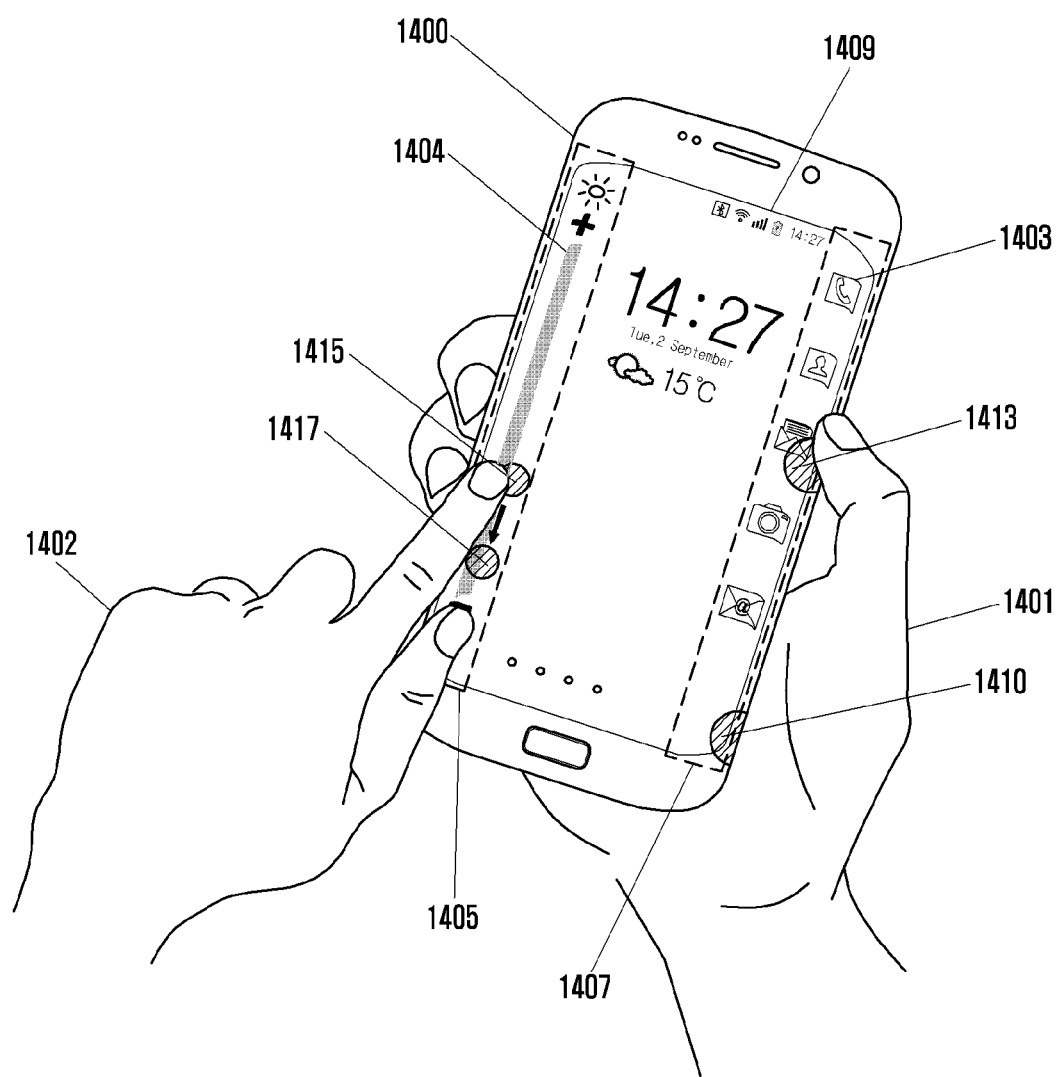
FIGS. 14A to 14C illustrate touch event processing on two curved displays of an electronic device, according to an embodiment of the present disclosure.
Figure 14B:
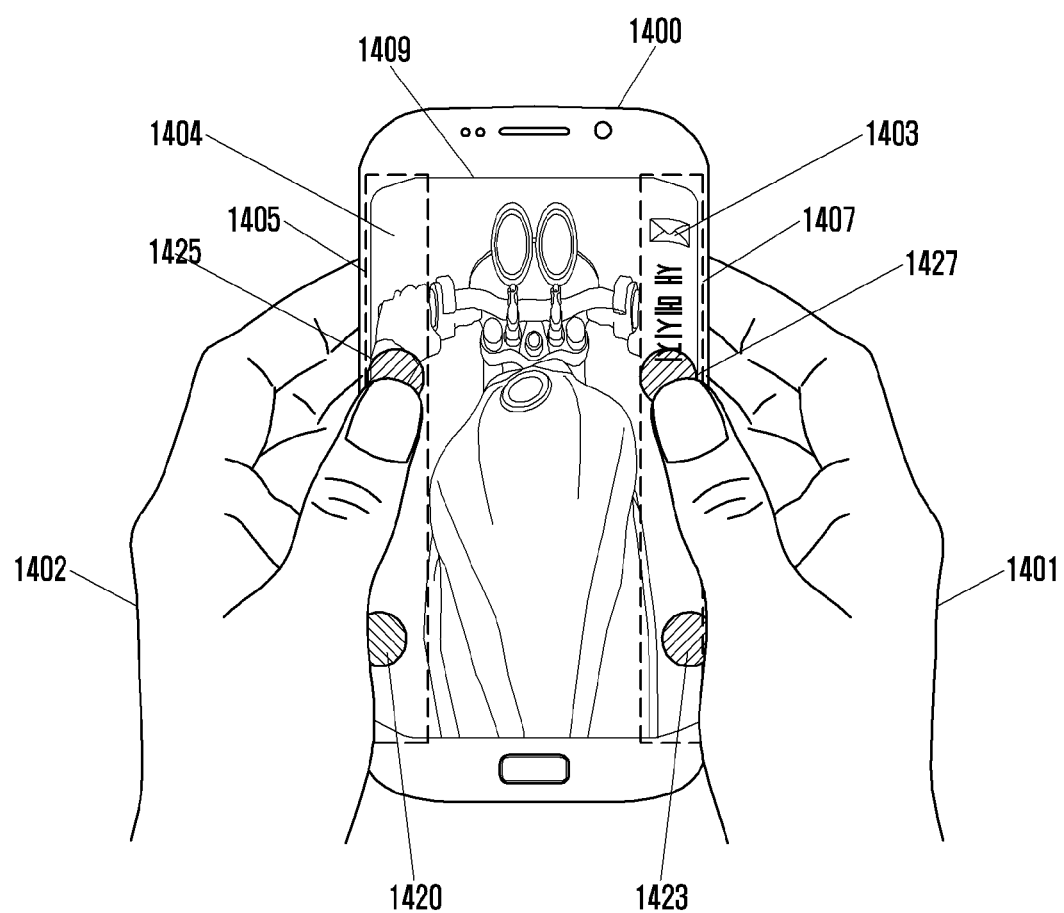
Figure 14C:
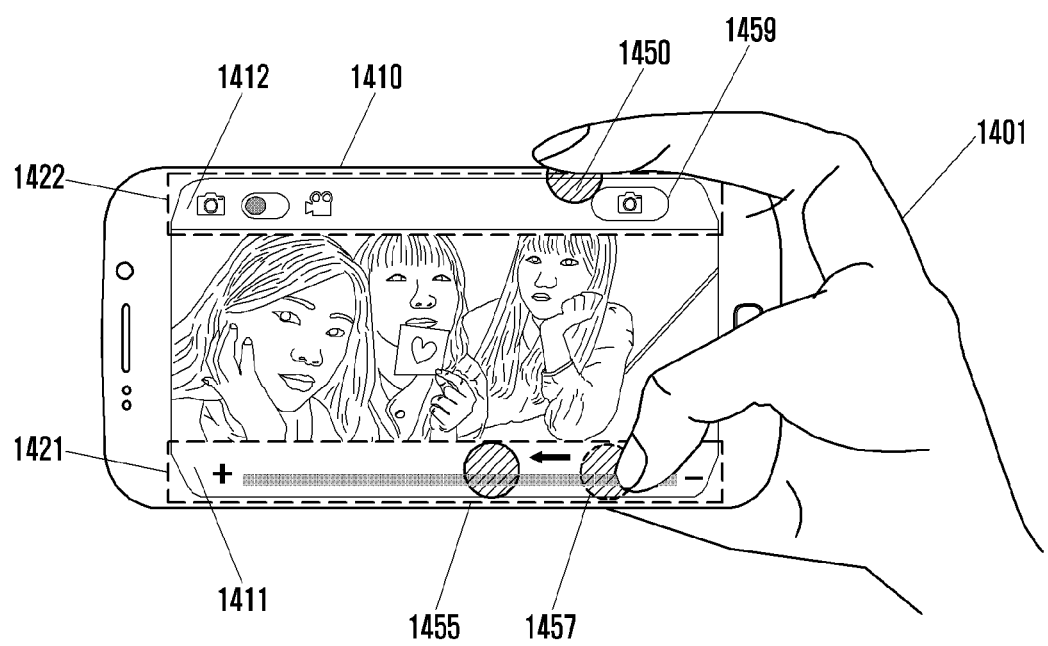

FIGS. 14A to 14C illustrate touch event processing on two curved displays of the electronic device, according to an embodiment of the present disclosure.

In FIGS. 14A to 14C, the electronic device 1400 may have curved displays at two sides. The display of the electronic device 1400 may include curved areas 1405 and 1407. For the electronic device 1400, touch input processing is described under the assumption that the area 1409 is a display area that is used to execute an application or is used by the user to make a touch gesture intentionally, and the area 1405 or 1407 is a display area on which unintended touch input is likely to occur.

The display of the electronic device 1400 may be functionally divided into the area 1409 and the area 1405 or 1407. The area 1409 may be used for executing applications (e.g. messaging application, schedule application, and Internet application), and the area 1405 or 1407 may be used for displaying icons associated with frequently used applications. The area 1305 or 1307 may also be used for displaying information on stock quotations, weather, or sports according to user settings. When a touch event is detected on the area 1405 or 1407, the electronic device may update the displayed information or execute an application related to the displayed information.

FIG. 14A depicts a situation where, while the user grips the electronic device 1300 with the right hand 1401, the user generates down event 1413 and up event on the area 1407 with the thumb or finger contacting the touch panel at one side to use a frequently used menu displayed at position 1403, and also generates down event 1415 and continued event 1417 on the area 1405 with the left hand 1402 to adjust brightness.

In this case, similar to the case of FIG. 13A, down event 1410 may be temporarily stored. When down event 1413 is detected, stored down event 1410 may be removed, and down event 1413 may be temporarily stored. Thereafter, while down event 1413 is still stored, when an up event is generated by releasing the finger within a preset time, down event 1413 and up event may be transferred to the corresponding application. Hence, the electronic device may provide a function according to down event 1413. Second, similarly to the case of FIG. 11, down event 1415 and continued event 1417 may be transferred to the corresponding application. Hence, it is possible for the electronic device to properly handle touch events occurring in a region close to the bezel, such as adjusting brightness of the display in conformance with the user's intention.

FIG. 14B depicts a situation where, while the user grips the electronic device 1400 with the right and left hands 1401 and 1402 to play a video game, the user generates down events 1420 and 1423 on the area 1405 or 1407 by the fingers contacting the touch panel at one side, and a notification indicating a new message arrival is displayed at position 1403 during the video game.

In this case, down event 1420 or 1423 generated on the area 1405 or 1407 may be temporarily stored. When down event 1425 is detected on the area 1405, stored down event 1420 or 1423 may be removed. Thereafter, when down event 1425 is followed by an up event within a given time or is followed by movement of greater than a given distance, down event 1425 may be transferred to the corresponding application. In addition, to check a newly received message during the game, when the user generates down event 1427 on the area 1407 and generates an up event within a given time, down event 1427 and up event may be transferred to the corresponding application, activating a message-related function. For example, the electronic device may display the contents of the new message on the area 1409.

FIG. 14C depicts a situation where, while the user grips the electronic device 1400 with the right hand 1101 to take a photograph in landscape orientation, the user generates down event 1450 on a region 1422 by a finger contacting the touch panel at one side, and generates down event 1457 and continued event 1455 with the thumb to manipulate a zoom adjustment item displayed on a region 1411. In this case, similar to the case of FIG. 12A, down event 1450 detected on the region 1412 may be temporarily stored. When down event 1457 is detected on the region 1421, stored down event 1450 may be removed, and only touch event 1457 and continued event 1455 may be transferred to the corresponding application. Thereby, the electronic device may provide a zoom adjustment function.

In addition, referring to FIG. 14C, it is assumed that, while the user grips the electronic device 1400 with the right hand 1401, the user generates touch event 1457 with the thumb and generates touch event 1450 on the camera button 1459 with the forefinger. In this case, when touch event 1457 is detected on the region 1421, although touch event 1457 may be determined as a valid touch because its contact region is close to a very small circle, touch event 1457 may be temporarily stored. Thereafter, when touch event 1450 is detected on the region 1412, stored touch event 1457 may be removed. If touch event 1450 is determined as a valid touch, it is temporarily stored. When the user generates an up event within a given time by releasing the finger from the camera button 1459, touch event 1450 and up event may be transferred to the corresponding application. Hence, the electronic device 1400 may provide a photographing function. As a result, the user may utilize touch features of the electronic device having curved displays at two sides in a convenient manner.

It may be seen from FIGS. 14A to 14C that it is possible to prevent malfunction due to unintended touch input by selecting a touch event conforming to the user's intention only on the basis of attributes of the touch event.

According to an embodiment of the present disclosure, to accurately select a touch event conforming to the user's intention from among input touch events, it is possible to configure and update touch input parameters for touch event processing.

Figure 15:
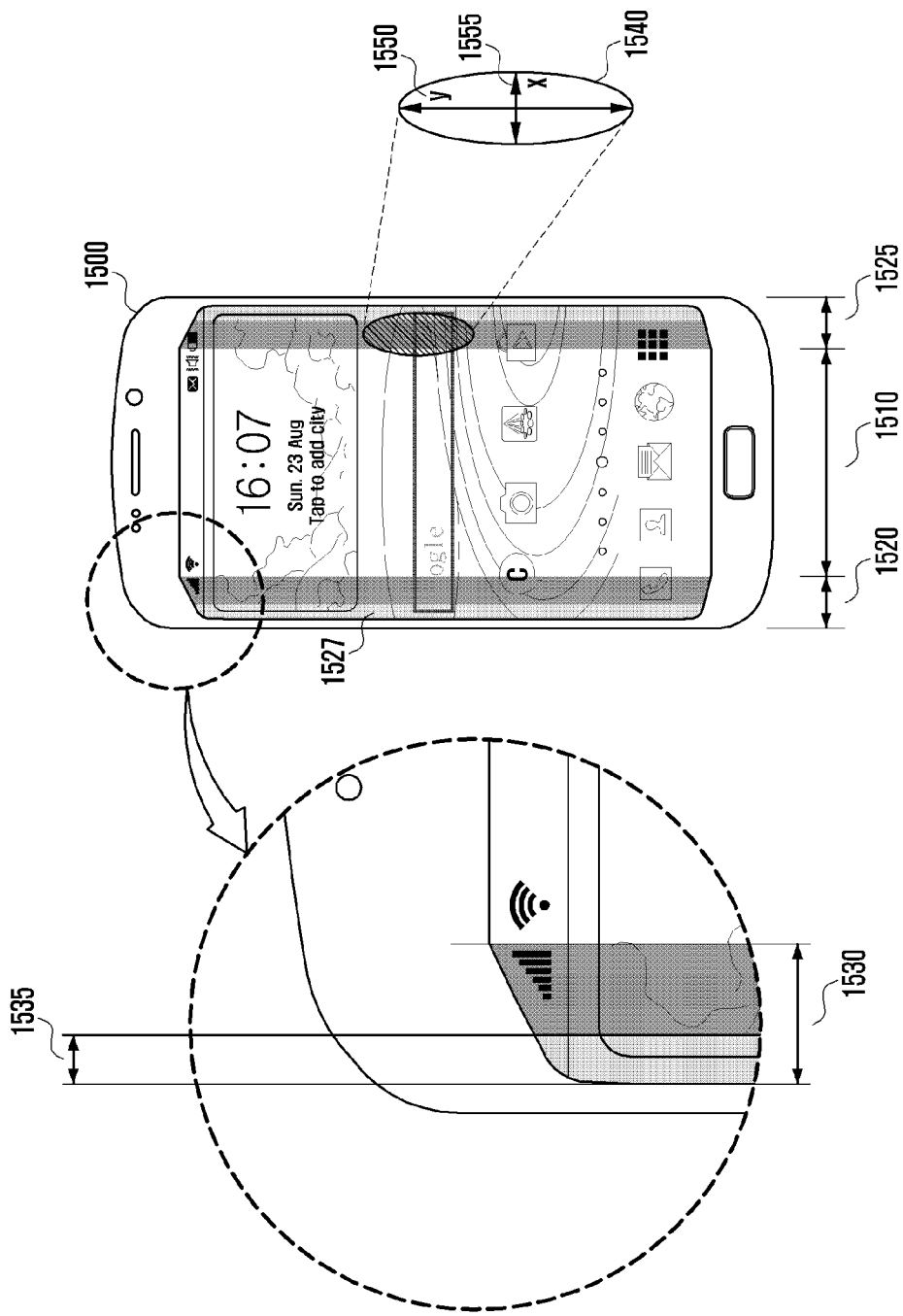
FIG. 15 illustrates parameters defined for touch input processing, according to an embodiment of the present disclosure.

FIG. 15 illustrates parameters defined for touch input processing, according to an embodiment of the present disclosure.

In an embodiment of the present disclosure, the electronic device 1500 may have a flat area 1510 and curved areas 1520 and 1525. The display of the electronic device 1500 may include a dead zone 1527 to remove unintended touch input. Touch input parameters may include dead zone width 1535 (for dead zone 1527), curved area width 1530 (for curved area 1520), and contact region size and difference between the major axis 1550 and minor axis 1555 of the contact region 1540 (for a touch event). That is, it is possible to change the parameters 1530 and 1535 to thereby adjust the designated area for determining whether to store a down event. It is also possible to change thresholds related to the parameters 1540, 1550 and 1555 to adjust the criteria for determining whether a touch event is associated with gripping. The touch input parameters described above are illustrative only, and the present disclosure is not limited thereto.

Figure 16:
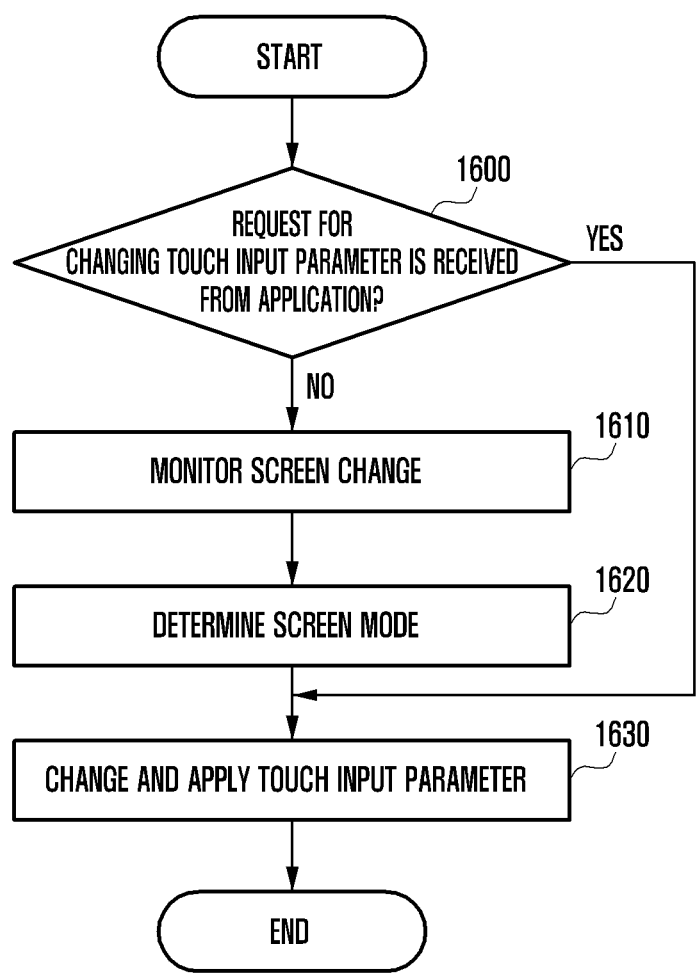
FIG. 16 is a flowchart of a procedure for updating touch input parameters according to an embodiment of the present disclosure.

FIG. 16 is a flowchart of a procedure for updating touch input parameters according to an embodiment of the present disclosure.

Referring to FIG. 16, at Step 1600, the electronic device checks whether a request for changing a touch input parameter is received from a specific application. If a request for changing a touch input parameter is received from a specific application, at Step 1630, the electronic device changes and applies the corresponding touch input parameter. The request for changing a touch input parameter may include information on a specific touch input parameter preset in consideration of the screen for the application.

If a request for changing a touch input parameter is not received from a specific application, at Step 1610, the electronic device senses a change in the screen on the display. A change in the screen may be sensed through a signal from the OS input framework 740. At Step 1620, the electronic device determines the mode of the changed screen. For example, the screen mode may be normal mode, home mode, lock screen mode, key input mode, game mode, call mode, navigation mode, Internet mode, list UI mode, or landscape mode. At Step 1630, the electronic device changes and applies the corresponding touch input parameter on the basis of information on touch input parameters for the determined mode. For example, a touch input parameter may be input through the TSP driver 733, and the TSP driver 733 or touch input manager 405 of the OS input framework 740 may process an input touch event on the basis of the changed touch input parameter.

Embodiments of the present disclosure disclosed in the specification and the drawings are examples to describe the details of the present disclosure and assist in understanding of the present disclosure, and do not limit the scope of the present disclosure. It will be apparent to those having ordinary knowledge in the technical field, to which the present disclosure pertains, that it is possible to practice other modified embodiments based on the technical idea of the present disclosure as well as the embodiments disclosed herein.

Although certain embodiments of the present disclosure have been shown and described in this specification and the drawings, they are used in a general sense in order to explain technical contents of the present disclosure, and to help comprehension of the present disclosure, and do not limit the scope of the present disclosure. It is obvious to those skilled in the art to which the present disclosure pertains that other modified embodiments on the basis of the spirits of the present disclosure besides the embodiments disclosed herein may be carried out. Accordingly, the scope of the present disclosure is defined by the appended claims and their equivalents, and it will be construed that all corrections and modifications derived from the meanings and scope of the following claims and the equivalents fall within the scope of the present disclosure.

What is claimed is:

1. An electronic device comprising:
   a housing including a first surface oriented in a first direction, and a second surface extending from the edge of the first surface in a second direction different from the first direction and being narrower than the first surface;
   a touchscreen display including a touch panel, and having a first section exposed through the first surface and a second section exposed through the second surface;
   a processor electrically connected with the touchscreen display; and
   a memory electrically connected with the processor,
       wherein the memory stores instructions that cause, when executed, the processor to:
           activate the touch panel,
           detect a first touch event on the second section of the touchscreen display,
           temporarily store the first touch event,
           detect a second touch event on the first section or the second section after detection of the first touch event,
           if the second touch event is detected on the first section, remove the first touch event, and perform a function according to the second touch event,
           if the second touch event is detected on the second section, temporarily store the second touch event after removing the first touch event,
           perform a function according to the second touch event and a third touch event in response to detecting the third touch event within a preset time after detection of the second touch event, and
           remove the second touch event and the third touch event in response to detecting the third touch event after the preset time after detection of the second touch event.

2. The electronic device of claim 1, wherein the second surface is partially bent.

3. The electronic device of claim 1, wherein the first surface includes a first side of a first length, a second side of a second length longer than the first length, a third side of the first length, and a fourth side of the second length,
   wherein the first side is perpendicular to the second side and the fourth side and is parallel with the third side, and
   wherein an edge of the second surface comprises the second side.

4. The electronic device of claim 3, wherein the second surface of the touchscreen display is extended from the edge of the first surface.

5. The electronic device of claim 1, wherein the first surface is flat.

6. The electronic device of claim 1, wherein the instructions cause the processor to determine which one of the first touch event and the second touch event has occurred on the first section, to perform a function according at least partly to the touch event having occurred on the first section, and to remove the remaining touch event having occurred on the second section.

7. The electronic device of claim 1, wherein, when third touch event is detected on the first section, the instructions cause the processor to remove the second touch event and to perform a function according at least partly to the third touch event.

8. The electronic device of claim 1, wherein, when the first touch event is detected on the first section and the second touch event is detected on the second section, the instructions cause the processor to remove the second touch event and to perform a function according at least partly to the first touch event.

9. An electronic device comprising:
a housing that includes a first surface oriented in a first direction, and a second surface extending from the edge of the first surface in a second direction different from the first direction and being narrower than the first surface;
a touchscreen display including a touch panel, and having a first section exposed through the first surface and a second section exposed through the second surface;
a processor electrically connected with the touchscreen display; and
a memory electrically connected with the processor,
wherein the memory stores instructions that cause, when executed, the processor to:
activate the touch panel, to
detect a first touch event on a first region of the second section of the touchscreen display,
detect a second touch event on a second region of the second section different from the first region after detection of the first touch event,
determine if an occurrence time between the detection of the first touch event and the detection of the second touch event is less than a predetermined threshold,
use the first touch event while deleting the second touch event if it is determined that the occurrence time between the detection of the first touch event and the detection of the second touch event is not less than the predetermined threshold, and
use the second touch event while deleting the first touch event if it is determined that the occurrence time between the detection of the first touch event and the detection of the second touch event is less than the predetermined threshold.

10. The electronic device of claim 9, wherein the instructions cause the processor to determine whether at least one of the first touch event and the second touch event constitutes a gesture event, and to perform a function according at least partly to the determined touch event.

11. The electronic device of claim 9, wherein the second touch event corresponds to a touch gesture involving movement from a touch point of the first touch event without touch-release.

12. A method of touch event processing in an electronic device, the method comprising:
activating a touch screen display;
detecting a first touch event on a second section of the touchscreen display;
temporarily storing the first touch event;
detecting a second touch event on a first section or the second section of the touch screen display after detection of the first touch event;
if the second touch event is detected on the first section, removing the first touch event, and performing a function according to the second touch event;
if the second touch event is detected on the second section, temporarily storing the second touch event after removing the first touch event;
performing a function according to the second touch event and a third touch event in response to detecting the third touch event within a preset time after detection of the second touch event; and
removing the second touch event and the third touch event in response to detecting the third touch event after the preset time after detection of the second touch event.

13. The method of claim 12, wherein the second surface is partially bent.

14. The method of claim 12, wherein a first surface of the electronic device includes a first side of a first length, a second side of a second length longer than the first length, a third side of the first length, and a fourth side of the second length, wherein the first side is perpendicular to the second side and the fourth side and is parallel with the third side, and wherein an edge of a second surface of the electronic device comprises the second side.

15. The method of claim 14, wherein the second surface of the touchscreen display is extended from the edge of the first surface.

16. The method of claim 12, wherein the first surface is flat.

17. The method of claim 12, further comprising:
determining which one of the first touch event and the second touch event has occurred on the first section; and
performing a function according at least partly to the touch event having occurred on the first section, and removing the remaining touch event having occurred on the second section.

18. The method of claim 12, further comprising removing the second touch event and performing a function according at least partly to the third touch event when the third touch event is detected on the first section.

19. The method of claim 12, further comprising removing the second touch event and performing a function according at least partly to the first touch event when the first touch event is detected on the first section and the second touch event is detected on the second section.

* * * * *